US011323749B2

(12) United States Patent
Zheng et al.

(10) Patent No.: US 11,323,749 B2
(45) Date of Patent: May 3, 2022

(54) VIDEO CODING WITH SUCCESSIVE CODECS

(71) Applicant: Huawei Technologies Co., Ltd., Shenzhen (CN)

(72) Inventors: Jianhua Zheng, Beijing (CN); Quanhe Yu, Beijing (CN); Meng Li, Beijing (CN); Hai Chen, Shenzhen (CN); Chen-Xiong Zhang, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/062,110

(22) Filed: Oct. 2, 2020

(65) Prior Publication Data
US 2021/0021874 A1 Jan. 21, 2021

Related U.S. Application Data

(60) Provisional application No. 62/651,533, filed on Apr. 2, 2018.

(51) Int. Cl.
H04N 19/98 (2014.01)
H04N 19/13 (2014.01)
H04N 19/186 (2014.01)
H04N 19/85 (2014.01)
H04N 19/70 (2014.01)

(52) U.S. Cl.
CPC ............ H04N 19/98 (2014.11); H04N 19/13 (2014.11); H04N 19/186 (2014.11); H04N 19/70 (2014.11); H04N 19/85 (2014.11)

(58) Field of Classification Search
None
See application file for complete search history.

(56) References Cited

U.S. PATENT DOCUMENTS

2005/0063471 A1* 3/2005 Regunathan ........... H04N 19/61
375/240.21
2008/0170615 A1* 7/2008 Sekiguchi .............. H04N 19/70
375/240.14

(Continued)

FOREIGN PATENT DOCUMENTS

CN 102695053 A 9/2012
CN 102835105 A 12/2012

(Continued)

OTHER PUBLICATIONS

Chen et al., "Test Model 9 of 3D-HEVC and MV-HEVC," Joint Collaborative Team on 3D Video Coding Extension Development of ITU-T SG 16 WP 3 and ISO/IEC JTC 1/SC 29/WG 11, 9th Meeting: Sapporo, JP, JCT3V-I1003, total 57 pages (Jul. 3-9, 2014).

(Continued)

*Primary Examiner* — Patricia I Young
(74) *Attorney, Agent, or Firm* — Leydig, Voit & Mayer, Ltd.

(57) ABSTRACT

A video coding mechanism is disclosed. The mechanism includes at least one pre-encoder configured to pre-encode a received input video signal, and output a pre-encoded video signal. The mechanism also includes an encoder configured to obtain the pre-encoded video signal from the pre-encoder, and encode the pre-encoded video signal as a bitstream for transmitting the bitstream to decoder for decoding.

18 Claims, 12 Drawing Sheets

(56) References Cited

U.S. PATENT DOCUMENTS

2016/0360215 A1* 12/2016 Rusanovskyy ...... H04N 19/186
2017/0105014 A1*  4/2017 Lee ................... H04N 19/30
2017/0332098 A1* 11/2017 Rusanovskyy ........ H04N 19/98

FOREIGN PATENT DOCUMENTS

| CN | 106105202 A  | 11/2016 |
| CN | 107818266 A  | 3/2018  |
| WO | 2015128295 A1 | 9/2015  |
| WO | 2018035696 A1 | 3/2018  |
| WO | 2018035879 A1 | 3/2018  |

OTHER PUBLICATIONS

"Series H: Audiovisual and Multimedia Systems Infrastructure of audiovisiual services—Coding of moving video. High efficiency video coding," ITU-T H.265 Telecommunication Standardization Sector of ITU, total 692 pages, International Telecommunication Union, Geneva, Switzerland (Feb. 2018).

"Series H: Audiovisual and Multimedia Systems, Infrastructure of audiovisual services—Coding of moving video. Advanced video coding for generic audiovisual services," ITU-T H.264 Telecommunication Standardization Sector of ITU, total 812 pages, International Telecommunication Union, Geneva, Switzerland (Apr. 2017).

Chen et al., "Description of SDR, HDR and 360° video coding technology proposal by Huawei, GoPro, HiSilicon, and Samsung," JVET-J0025, XP030151191, San Diego, US, total 132 pages (Apr. 10-20, 2018).

Pinho, "An Online Preprocessing Technique for Improving the Lossless Compression of Images With Sparse Histograms," IEEE Signal Processing Letters, vol. 9, No. 1, pp. 5-7, Institute of Electrical and Electronics Engineers, New York, New York (Jan. 2002).

* cited by examiner

VIDEO CODING WITH SUCCESSIVE CODECS

CROSS-REFERENCE TO RELATED APPLICATIONS

This application is a continuation of International Application No. PCT/CN2019/081041, filed on Apr. 2, 2019, which claims the benefit of U.S. Provisional Patent Application No. 62/651,533, filed Apr. 2, 2018. The disclosures of the aforementioned applications are hereby incorporated by reference in their entireties.

TECHNICAL FIELD

The present disclosure is generally related to video coding, and is specifically related to performing video coding using successive coding and decoding (codec) systems.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect of the embodiments of the present application relates to an encoding method. The method includes: pre-encoding input video signal by a pre-encoder encoder in a generalized video encoder to generate a pre-encoded signal, in which the generalized video encoder includes N cascade connected encoders, and N is larger than one, and at least one of N encoder comprises entropy encoding having the capability to encode the signal into video bitstream; forwarding the pre-encoded signal to a follow-up video encoder, in which the pre-encoded signal is more compact compared with the input video signal; and entropy encoding performed by the video encoder having entropy encoding capability in the cascade connected encoders to generate a video bitstream. The video encoder having entropy encoding capability may be the last encoder in the cascade connected encoders. The pre-encoder encoder in a generalized video encoder may be called a first encoder.

In an optional implementation of the first aspect, the step of pre-encoding the input video signal, including: pre-encoding the input video signal performed via quantization or scaling by the pre-encoder in the generalized video encoder.

In an optional implementation of the first aspect, pre-encoding the input video signal including: pre-encoding the input video signal performed via remapping by the pre-encoder in the generalized video encoder.

In an optional implementation of the first aspect, pre-encoding the Y component of input video signal performed by the pre-encoder in the generalized video encoder, or pre-encoding the Chroma component of input video signal performed by the pre-encoder in the generalized video encoder.

In an optional implementation of the first aspect, side information of input video signal is forwarded by the pre-encoder to the video encoder having entropy encoding capability to encode the side information into video bitstream.

In an optional implementation of the first aspect, the side information includes the information to describe the input signal features, in which, average of the input signal, max value of the signal, the min value of the signal are signaled in the bitstream.

In an optional implementation of the first aspect, the side information is signaled the video encoder having entropy encoding capability in a certain syntax level in the video bitstream, while certain syntax level can be anyone of the header of sequence, the header of picture, the header of slice.

A second aspect of the embodiments of the present application relates to a decoding method. The method includes: decoding the video bitstream performed by a first decoder in the cascade connected decoders in the generalized video decoder to obtain decoded signals, in which generalized video decoder includes N cascade connected decoders, and N larger than one, and at least one of N decoder comprises entropy decoding and having the capability to decode the signal from video bitstream; and post-decoding the signal from the first decoder by the follow-up video decoder in the generalized video decoder to generate post-decoder signal, in which the post-decoder signal from the first decoder is more compact compared with the output of the post-decoding video signal.

In an optional implementation of the second aspect, post-decoding the signal from the first decoder by the follow-up video decoder in the generalized video decoder further comprises: post-decoding the signal from the first decoder via inverse-quantization by the follow-up video decoder in the generalized video decoder.

In an optional implementation of the second aspect, post-decoding the signal from the first decoder by the follow-up video decoder further comprises: post-decoding the signal from the first decoder via inverse-remapping by the follow-up video decoder in the generalized video decoder.

In an optional implementation of the second aspect, post-decoding the signal from the first decoder by the follow-up video decoder further comprises: post-decoding the Y component of the signal from the first decoder by the follow-up video decoder in the generalized video decoder, or post-decoding the Chroma components of in the signal from the first decoder by the follow-up video decoder in the generalized video decoder.

In an optional implementation of the second aspect, side information obtained from video bitstream is forwarded to the follow-up video decoder, from a certain syntax level of video bitstream, while certain syntax level can be any one of the header of sequence, the header of picture, the header of slice, and the side information include at least the information of anyone of average of the input signal, max value of the signal, the min value of the signal.

The pre-encoder encoder, encoder, first decoder, and post-decoder described in any previous aspects may be implemented by hardware or software, or combination of hardware and software.

According to a third aspect, a method implemented in a video coding device is provided. The method includes: obtaining, at one or more processors, an input video signal; pre-encoding, by the one or more processors, the input video signal as a pre-encoded video signal; and encoding, by the one or more processors, the pre-encoded video signal as a bitstream, in which the bitstream is used to be transmitted to a decoder for decoding.

According to a fourth aspect, a method implemented in a video coding device is provided. The method includes: decoding, by one or more processors, a received bitstream into a decoded video signal; post-decoding, by the one or more processors, the decoded video signal to obtain a reconstructed video signal; and outputting, by the one or more processors, the reconstructed video signal for display.

The method according to the first aspect or the third aspect of the present application can be performed by the apparatus according to the fifth aspect of the present application. Further features and implementation forms of the method according to the fifth aspect of the present application correspond to the features and implementation forms of the apparatus according to the first aspect or the third aspect of the present application.

The method according to the second aspect or the fourth aspect of the present application can be performed by the apparatus according to the sixth aspect of the present application. Further features and implementation forms of the method according to the sixth aspect of the present application correspond to the features and implementation forms of the apparatus according to the second aspect or the fourth aspect of the present application.

According to a seventh aspect the present application relates to an apparatus for decoding a video stream includes a processor and a memory. The memory is storing instructions that cause the processor to perform the method according to the second aspect or the fourth aspect of the present application.

According to an eighth aspect the present application relates to an apparatus for encoding a video stream includes a processor and a memory. The memory is storing instructions that cause the processor to perform the method according to the first aspect or the third aspect.

According to a ninth aspect, a computer-readable storage medium having stored thereon instructions that when executed cause one or more processors configured to code video data is proposed. The instructions cause the one or more processors to perform a method according to the first, second, third, or fourth aspect or any possible embodiment of the first, second, third, or fourth aspect.

According to a tenth aspect, the present application relates to a computer program comprising program code for performing the method according to the first, second, third, or fourth aspect or any possible embodiment of the first, second, third, or fourth aspect when executed on a computer.

Experimental results show that the compression performance of a codec according to the present disclosure is increased. The framework of the present disclosure has significant benefits over other video codecs while the overall complexity is lower.

Any aspect shown or described in this document and additionally to any combination of aspects shown or described in this document.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
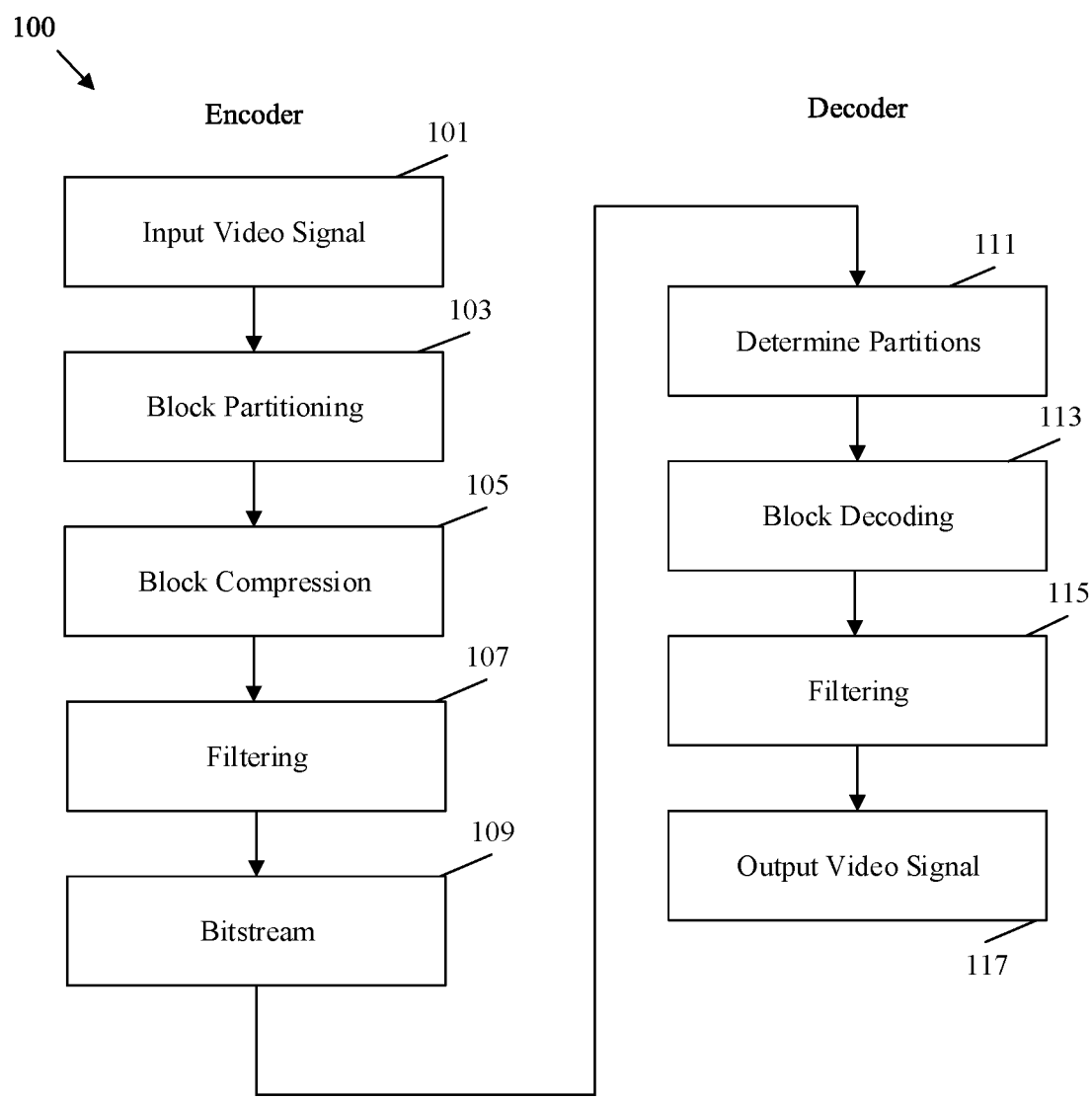
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding, which includes video encoding and video decoding may be used in a wide range of digital video applications, such as in broadcast digital television (TV), video transmission over internet and mobile networks, real-time conversational applications such as video chat, video conferencing, digital versatile disc (DVD), Blu-ray discs, video content acquisition and editing systems, and camcorders of security applications. Video coding may refer to the processing of a sequence of pictures, which form a video or video sequence. It should be noted that the terms picture, frame, and/or image may be used as synonyms (e.g., interchangeably) in the field of video coding. Video coding comprises video encoding at an encoder and video decoding at a decoder, and hence the term video coding can refer to encoding, decoding, or both depending on context. Video encoding is performed at a source side, for example by processing (e.g. by compression) video pictures to reduce the amount of data used to represent the video pictures (e.g., for more efficient storage and/or transmission). Video decoding is performed at a destination side and may comprise inverse processing when compared to the encoding to reconstruct the video pictures. Examples referring to coding of video pictures (or pictures in general) shall be understood to relate to both, encoding and decoding of video pictures. The combination of encoding components and decoding components is also referred to as coding and decoding (CO-DEC).

A digital picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For a representation of color, three color components can be employed. For example, the picture may be represented or may include three sample arrays. In red blue green (RBG) format or RGB color space, a picture comprises a corresponding red, green and blue sample array. However, in some video coding technologies, each pixel can be represented in a luminance/chrominance format or color space, such as a luma (Y), blue difference chroma (Cb), and red difference chroma (Cr) (YCbCr) color space and/or a YUV color space comprising a luminance component indicated by Y (or sometimes L) and two chrominance components indicated by U and V. The luminance (also referred to as luma) component Y represents the brightness or grey level intensity (e.g., as in a grey-scale picture), while the two chrominance (also referred to as chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

Block-based hybrid video coding approaches split luma and chroma components into blocks and employ rate distortion optimization (RDO) to encode such block. For example, an RDO process may use multiple coding tools to attempt to encode a block. The RDO process then selects the coding tool that provides the best coding efficiency (e.g., bitrate/file size reduction) without sacrificing picture quality. Such video coding approaches include Motion Picture Experts Group (MPEG)-1 video, MPEG-2 video, International Telecommunications Union (ITU) Telecommunications Standardization Sector (ITU-T) H.262/MPEG-2, ITU-T H.263, ITU-T H.264/MPEG-4, Part 10, Advanced Video Coding (AVC), ITU-T H.265/High Efficiency Video Coding (HEVC), and extensions, e.g. scalability and/or three-dimensional (3D) extensions, of these standards. Such video coding approaches have been repeatedly modified to increase video compression performance. However, such modifications have also significantly increased the complexity of video encoding (e.g., including the RDO process) and video decoding. The encoding time of H.265/HEVC is six times longer than the encoding time of H.264/AVC, and a particular Joint Exploration test Model (JEM) implementation used for next generation video coding (NGVC) has an encoding time that is seventeen times longer than H.265/HEVC. The significant increase in complexity for NGVC implementations creates significant challenges for video codec chip design. For example, NGVC implementations may be capable of providing better compression than AVC, but may employ one hundred and two times more processing resources (e.g., processor cycles) to complete an encoding.

Disclosed herein are improved codec designs to reduce the overall average complexity of video coding (e.g., to reduce the complexity of NGVC). Specifically, the disclosed embodiments employ an encoder with one or more pre-encoder stages and a decoder with one or more post-decoder stages. The coding complexity is balanced between the successive codecs, and hence the overall compression performance is increased when compared to other video codec designs. For example, a pre-encoder can pre-encode an input video signal by reducing maximum values of the signal, increasing minimum values of the signal, and/or changing average values of the signal via a remapping process. Remapping may reduce variance between values (e.g., compression), and hence makes the resulting pre-encoded video signal less complex to encode by an encoder. For example, video signals with less variance may be encoded by employing simpler coding mechanisms and may result in less residual information than signals with greater variance between values. A remapping function can be applied to luma components, chroma components, or both in order to pre-encode an input video signal as a pre-encoded video signal. Further, remapping can be applied to an input video signal in PQ format and/or in HLG format. The pre-encoder can also forward side information to the encoder having entropy encoding capability to encode the side information into video bitstream. The side information includes signal characteristics of the input video signal prior to pre-encoding. It should be noted that pre-encoding is different from pre-processing as pre-encoding is a reversible process, and hence the pre-encoding and remapping are reversed at the decoder to create a reconstructed video signal that matches the input video signal. In contrast, pre-processing may not be reversible at a decoder. The side information can be included in a sequence header, a picture header, a slice header, or combinations thereof.

In addition, the decoder includes one or more post-decoder stages to reverse the remapping and pre-encoding process to decompress a decoded video signal to create a reconstructed video signal. For example, a decoder can create a decoded video signal from the bitstream, the decoder also having entropy decoding capability to decode the side information from the bitstream. A post-decoder can obtain the decoded video signal and perform inverse remapping on the decoded video signal to create a reconstructed video signal. The inverse remapping can be performed based on the side information. For example, the inverse remapping can add variance back to the decoded video signal values to reverse variance removal by the pre-encoder(s). The post-decoder can post-decode luma values, chroma values, or both in order to mirror the pre-encoder. Further, the remapping of the post-decoder can be applied to HLG signals and/or PQ signals. As a result of employing pre-encoder(s) and post-decoder(s) the average complexity of the encoding and decoding processes are reduced. Accordingly, employing pre-encoder(s) and post-decoder(s) in conjunction with an encoder and a decoder, respectively, reduces the processing resources used at the encoder and decoder, respectively, during encoding and decoding.

Hence, the disclosure introduces alternative coding modules beyond those included in other video codecs. Specifically, pre-encoding module(s) are added before a video encoder, and post-decoding module(s) are added after a video decoder from a process flow standpoint. Accordingly, the input video signal is firstly fed into the pre-encoding module to get an optimized signal, which is more suitable for successive video encoder compression. After decoding the optimized signal at the video decoder, the optimized video signal is forwarded to the post-decoding module to reconstruct the video signal as the final decoding output. The aim for the pre-encoding module(s) may be to create a video signal that is optimized for encoding. Specifically, the pre-encoded signal may be more compact and optimized than the original input video signal, and thus the pre-encoded video signal can be more easily encoded while maintaining bitrate reduction (e.g., in comparison to the input video signal without pre-encoding). Hence, the compression performance of the codec is improved. Since the coding complexity is balanced between pre-encoding module(s) and the successive encoder (and between the decoder and post-decoding modules), the overall complexity for hardware implementations is reduced.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty four pixels by sixty four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code word is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
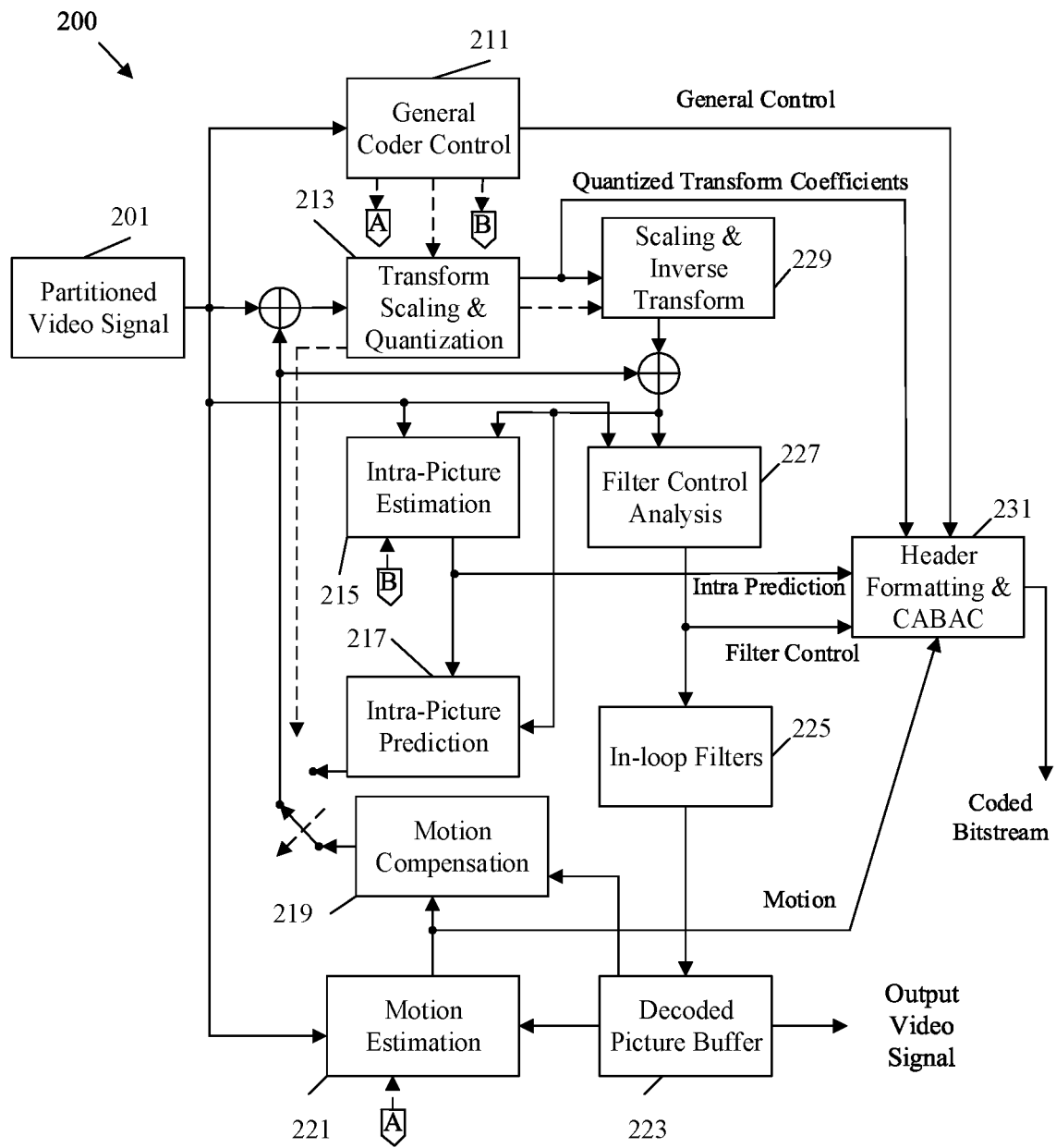
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or one or more transform unit (TUs) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as code word mapping tables), definitions of encoding contexts for various blocks, indications of most probable intra-prediction modes, an indication of partition information, etc. Such data may be encoded be employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
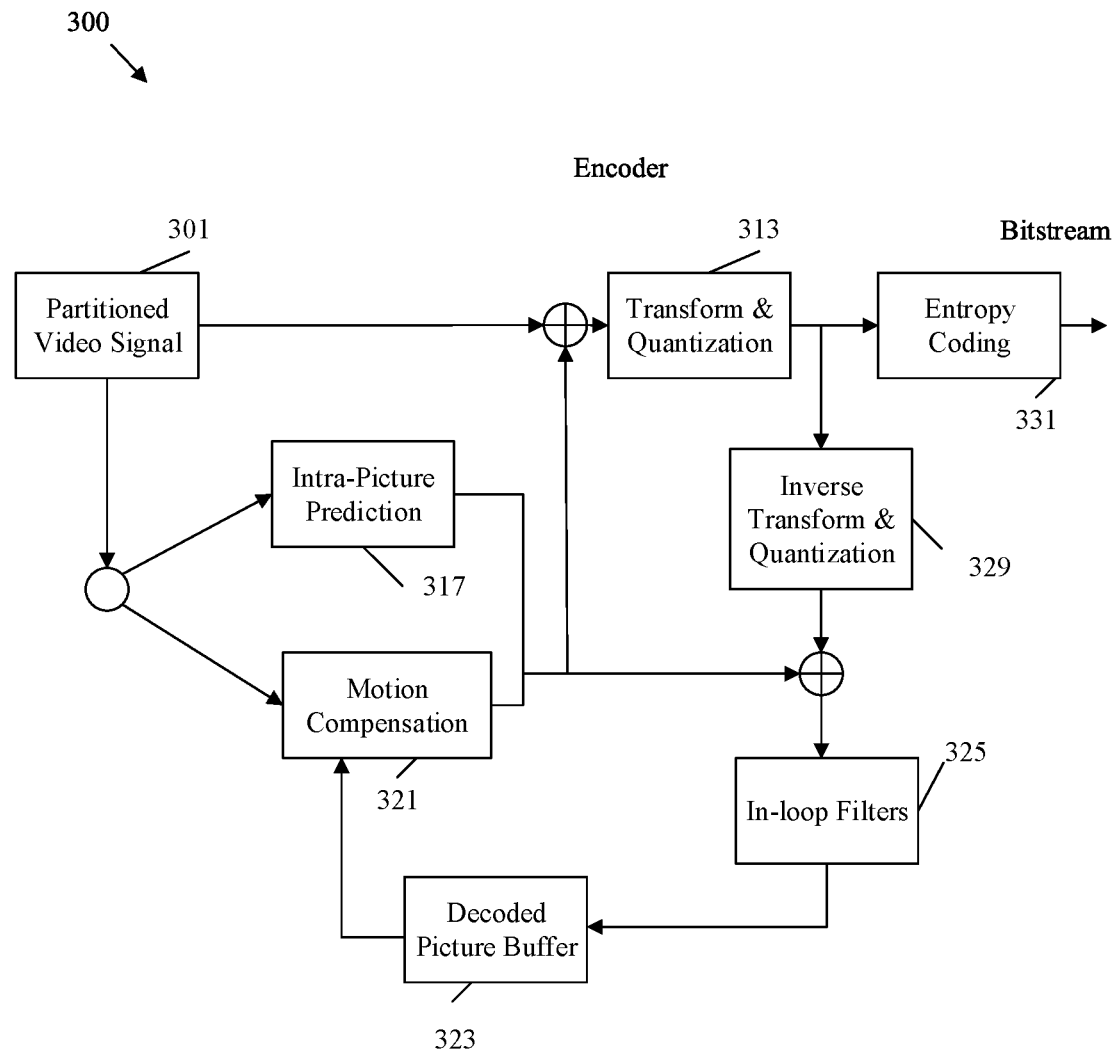
FIG. 3 is a schematic diagram illustrating an example video encoder that may implement a codec.

FIG. 3 is a block diagram illustrating an example video encoder 300 that may implement a codec, such as codec system 200. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transformation and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
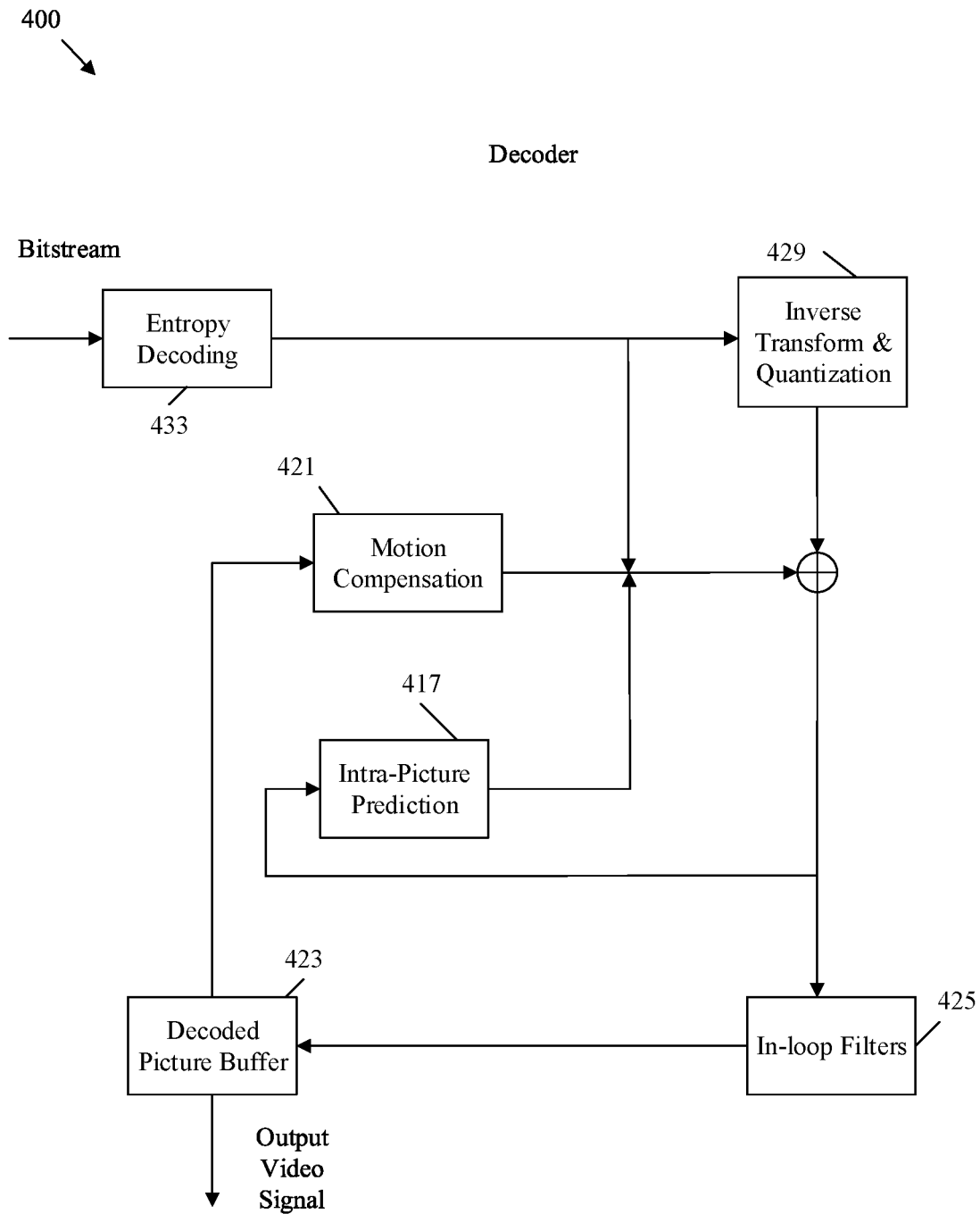
FIG. 4 is a schematic diagram illustrating an example video decoder that may implement a codec.

FIG. 4 is a block diagram illustrating an example video decoder 400 a codec, such as codec system 200. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as code words in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks, and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed video signal.

The present disclosure provides encoder and decoder designs to reduce the complexity of video coding according to method 100, codec system 200, encoder 300, and/or decoder 400. Specifically, the disclosure includes various implementations of encoders with pre-encoder stages and decoders with post-decoder stages. By employing multiple stages of codecs to pre-encode and post-decode a video signal, the complexity of the encoding and decoding process at the encoder and the decoder, respectively, is significantly reduced with little if any loss of video signal quality. Accordingly, the embodiments discussed herein support increased coding efficiency when applied in conjunction with method 100, codec system 200, encoder 300, and/or decoder 400 while maintaining or reducing processing and/or memory resource usage. Hence, the disclosed embodiments cause the method 100, codec system 200, encoder 300, and/or decoder 400 to operate in a more efficient manner by solving a technical problem associated with such systems, namely by reducing the ever increasing complexity of such systems while still supporting the complex coding functionality associated with such systems. Specific example embodiments of multi-stage encoders, decoders, and associated methods for use in conjunction with method 100, codec system 200, encoder 300, and/or decoder 400 are discussed herein below. The present disclosure includes a couple of successive codecs. The coding complexity is balanced between the couple of successive codecs, and hence the overall compression performance is better than other video codecs while the coding complexity is kept lower than other video codecs.

Furthermore, the present disclosure introduces alternative coding modules beyond other video codecs, in which a pre-encoding module is added before the entropy video encoder, and a post-decoding module is added after the entropy video decoder. Hence the input video signal is firstly fed into a pre-encoding module to get an optimized signal which is more suitable for the successive video encoder compression. After decoding the optimized signal from video decoder, the optimized signal is forwarded to the post-decoding module to reconstruct the video signal as the final decoding output. The aims for the pre-encoding module is to get an optimized signal, the pre-encoded signal is more compact and optimized than the original input signal, thus the pre-encoded signal can be more easily encoded to get a bitrate reduction than with the original input signal as input. Further, the compression performance is improved. Since the coding complexity is balanced between the pre-encoding module and the successive encoder, the overall complexity for the hardware implementation is reduced.

Figure 5:
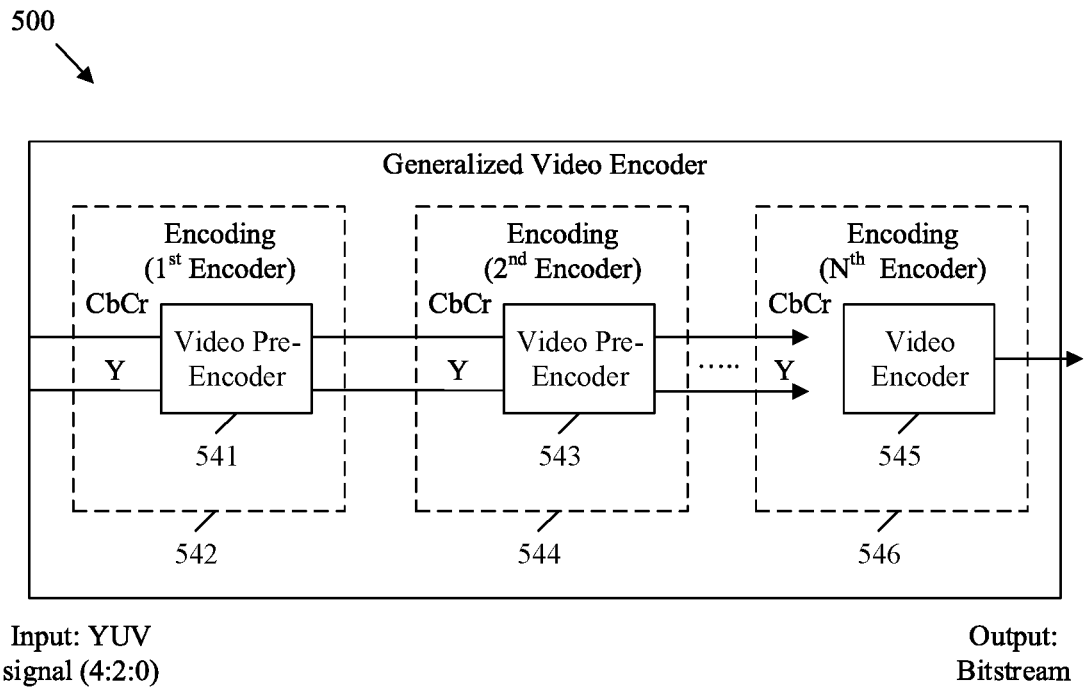
FIG. 5 is a schematic diagram illustrating an example multi-stage video encoder for performing encoding with successive stages.

FIG. 5 is a schematic diagram illustrating an example multi-stage video encoder 500 for performing encoding with successive stages. For example, the multi-stage video encoder 500 may be employed to implement steps 101, 103, 105, 107, and/or 109 of operating method 100, a codec system 200, and/or an encoder 300.

The multi-stage video encoder 500 includes N encoder stages connected in a cascade fashion, where N is any integer value greater than one. Specifically, the video encoder 500 includes a first encoding stage 542 with a first video pre-encoder 541, a second encoding stage 544 with a second video pre-encoder 543, and an Nth encoding stage 546 with a video encoder 545. While three video encoding stages 542, 544, and 546 are depicted, any number of stages in excess of one (e.g., a plurality) can be employed in the multi-stage video encoder 500. Regardless of the number of stages, at least one of the encoders (e.g., the video encoder 545 in the Nth encoding stage 546) is a legacy encoder, such as encoder 300, which contains high complexity coding tools to support entropy coding in order to encode a video signal into a bitstream. The other pre-encoders/stages are employed to pre-encode a video signal to provide simplified (e.g., compressed/remapped/pre-encoded) input to the video encoder 545 in order to reduce the operational complexity, and hence resource usage of the video encoder 545. The multi-stage video encoder 500 receives an input video signal with luma and chroma components (e.g., an YCbCr/YUV video signal) at the first encoding stage 542 and outputs an encoded video bitstream from the Nth encoding stage 546.

The functions of video encoding stages 542, 544, and 546 may each operate on luma components, chroma components, or combinations thereof. For example, the first video pre-encoder 541 in the first encoding stage 542 can operate on luma components and the second video pre-encoder 543 in the second encoding stage 544 can operate on chroma components, or vice versa. In another example, the first video pre-encoder 541 in the first encoding stage 542 and the second video pre-encoder 543 in the second encoding stage 544 can both operate on luma components and chroma components. In either example, the first video pre-encoder 541 and the second video pre-encoder 543 are components configured to pre-encode relevant portions (e.g., luma and/or chroma) of an input video signal to create a pre-encoded video signal. A pre-encoded video signal is an input video signal that has been modified, in a reversible fashion, to reduce the complexity of the signal to support ease of encoding. Such modification may include reducing the variance between video signal values to provide smaller value ranges. For example, a transfer function can be applied to reduce maximum input video signal values, increase minimum input video signal values, shift mean input video signal values, etc., in order to compress the input video signal into a pre-encoded signal that is less complex, for coding purposes, than the input video signal as received by the multi-stage video encoder 500. The first video pre-encoder 541 and the second video pre-encoder 543 can pass along signal characteristics of the input video signal to the video encoder 545 as side information. Such side information can be encoded in the output video bitstream (e.g., by the video encoder 545) to support reversing the pre-encoding/compression/remapping process at a decoder.

The first video pre-encoder 541 and the second video pre-encoder 543 may be implemented as so called light weight encoders with limited equipped coding tools. Further, the first video pre-encoder 541 and the second video pre-encoder 543 may not include entropy encoding tools. The goal of the light weight encoders (e.g., the first video pre-encoder 541 and the second video pre-encoder 543) is to employ compression techniques to create a compact and optimized video signal to support more effective (e.g., simpler, faster, more coding efficient, etc.) encoding by the video encoder 545 at the Nth encoding stage 546. The result is that the entire cascade of connected encoder and pre-encoders can encode an input video signal more efficiently (e.g., with less complexity/processor resource usage), than a single stage encoder operating by itself. Hence, the coding performance of the multi-stage video encoder 500 is significantly higher than a single stage video encoder. Since the coding complexity is balanced between the cascade of connected encoders (e.g., the first video pre-encoder 541, second video pre-encoder 543, and video encoder 545) the overall complexity of the multi-stage video encoder 500 is reduced compared to a legacy video encoder.

Figure 6:
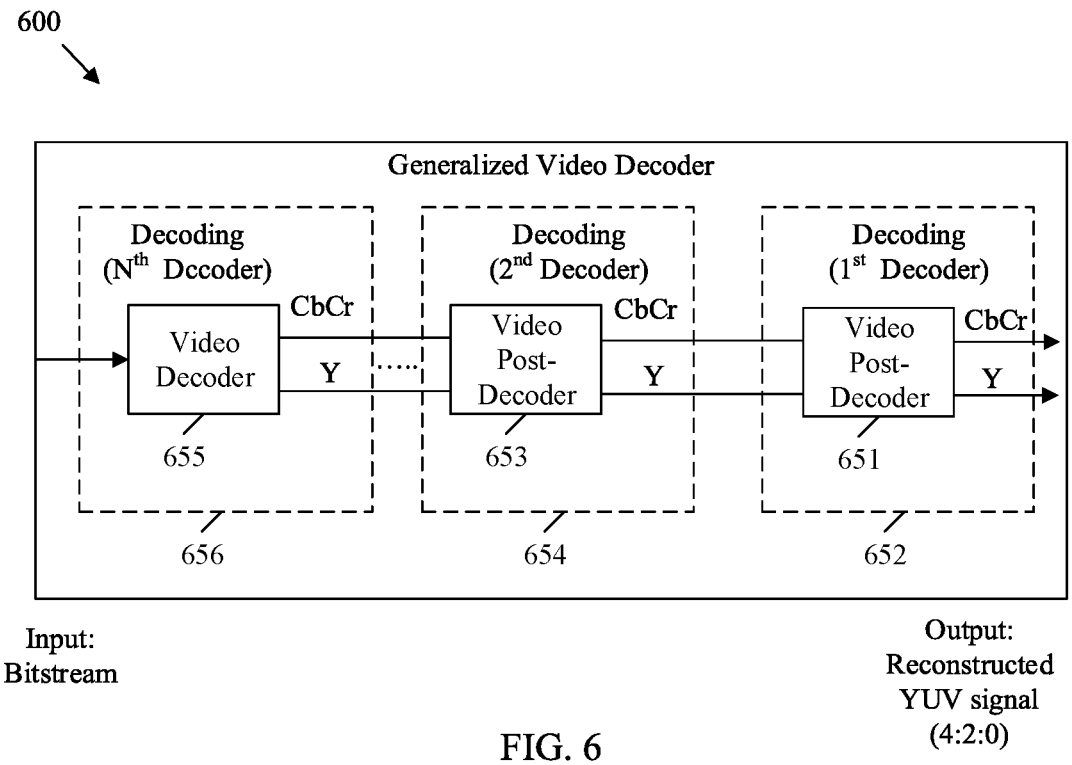
FIG. 6 is a schematic diagram illustrating an example multi-stage video decoder for performing decoding with successive stages.

FIG. 6 is a schematic diagram illustrating an example multi-stage video decoder 600 for performing decoding with successive stages. For example, the multi-stage video decoder 600 may be employed to implement steps 111, 113, 115, and/or 117 of operating method 100, a codec system 200, and/or a decoder 400. Further, the multi-stage video decoder 600 may be configured to decode a bitstream created by a multi-stage video encoder 500.

Like the multi-stage video encoder 500, the multi-stage video decoder 600 includes N decoder stages connected in a cascade fashion, where N is any integer value greater than one. Specifically, the multi-stage video decoder 600 includes a first decoding stage 652 with a first video post-decoder 651, a second decoding stage 654 with a second video post-decoder 653, and an Nth decoding stage 656 with a video decoder 645. While three video decoding stages 652, 654, and 656 are depicted, any number of stages in excess of one (e.g., a plurality) can be employed in the multi-stage video decoder 600. Regardless of the number of stages, at least one of the decoders (e.g., the video decoder 655 in the Nth decoding stage 656) is a legacy decoder, such as decoder 400, which contains high complexity coding tools to support entropy decoding in order to decode a video signal bitstream received from an encoder. The other post-decoders/stages are employed to post-decode a decoded video signal to reverse (e.g., de-compress/inverse remap/post-decoded) the modifications to the input video signal made by corresponding pre-encoders in a multistage video encoder. This approach reduces the operational complexity, and hence resource usage of the video decoder 655, while the input video signal encoded by a multi-stage encoder can be reconstructed at the multi-stage video decoder 600. The multi-stage video decoder 600 receives a video bitstream at the Nth decoding stage 656 and outputs a reconstructed video signal with luma and chroma components (e.g., an YCbCr/YUV video signal) from the first decoding stage 652.

The functions of video decoding stages 652, 654, and 656 may each operate on luma components, chroma components, or combinations thereof. For example, the first video post-decoder 651 in the first decoding stage 652 can operate on luma components and the second video post-decoder 653 in the second decoding stage 654 can operate on chroma components, or vice versa. In another example, the first video post-decoder 651 in the first decoding stage 652 and the second video post-decoder 653 in the second decoding stage 654 can both operate on luma components and chroma components. In either example, the video decoder 655 decodes the video bitstream to create a decoded video signal with luma and chroma components. The first video post-decoder 651 and the second video post-decoder 653 are components configured to post-decode relevant portions (e.g., luma and/or chroma) of the decoded video signal from the video decoder 655 to create a reconstructed video signal. A decoded video signal is a video signal that mirrors a pre-encoded video signal. Hence, the decoded video signal is bit matched to a pre-encoded video signal that has been modified (e.g., compressed/remapped/pre-encoded) from the original input video signal. As with the multi-stage encoder, the usage of multiple decoding stages allows the video decoder 655 to operate on a compressed, and hence less complex, set of data when decoding. Such compression may then be reversed by the first video post-decoder 651 and the second video post-decoder 653 to reconstruct a bit matched copy of the original input video signal. Reversing such compression may include increasing the variance between video signal values to provide larger value ranges. For example, a transfer function can be applied to increase maximum decoded video signal values, decrease minimum decoded video signal values, shift mean decoded video signal values, etc., in order to decompress the decoded video signal into a reconstructed video signal. The first video post-decoder 651 and the second video post-decoder 653 perform such decompression/post-decoding/inverse remapping based on the side information stored in the bitstream as received from the first video pre-encoder 641 and the second video pre-encoder 643.

The first video post-decoder 651 and the second video post-decoder 653 may be implemented as so called light weight decoders with limited equipped coding tools. Further, the first video post-decoder 651 and the second video post-decoder 653 may not include entropy decoding tools. The goal of the light weight decoders (e.g., the first video post-decoder 651 and the second video post-decoder 653) is to employ decompression techniques to reconstruct the input video signal to support more effective (e.g., simpler, faster, more coding efficient, etc.) decoding by the video decoder 655 at the Nth decoding stage 656. The order of the cascade of connected decoders is inverted in comparison to the order of encoders in the multi-stage video encoder. Also, the number of post-decoders in the multi-stage video decoder 600 may be same or less than the number of the pre-encoders in the multi-stage video encoder.

The result of using the multiple decoding stages is that the entire cascade of connected decoder and post-decoders can decode a bitstream more efficiently (e.g., with less complexity/processor resource usage), than a single stage decoder operating by itself. Hence, the coding performance of the multi-stage video decoder 600 is significantly higher than a single stage video decoder. Since the coding complexity is balanced between the cascade of connected encoders (e.g., the first video post-decoder 651, second video post-decoder 653, and video decoder 655) the overall complexity of the multi-stage video decoder 600 is reduced compared to a legacy video decoder.

Figure 7:
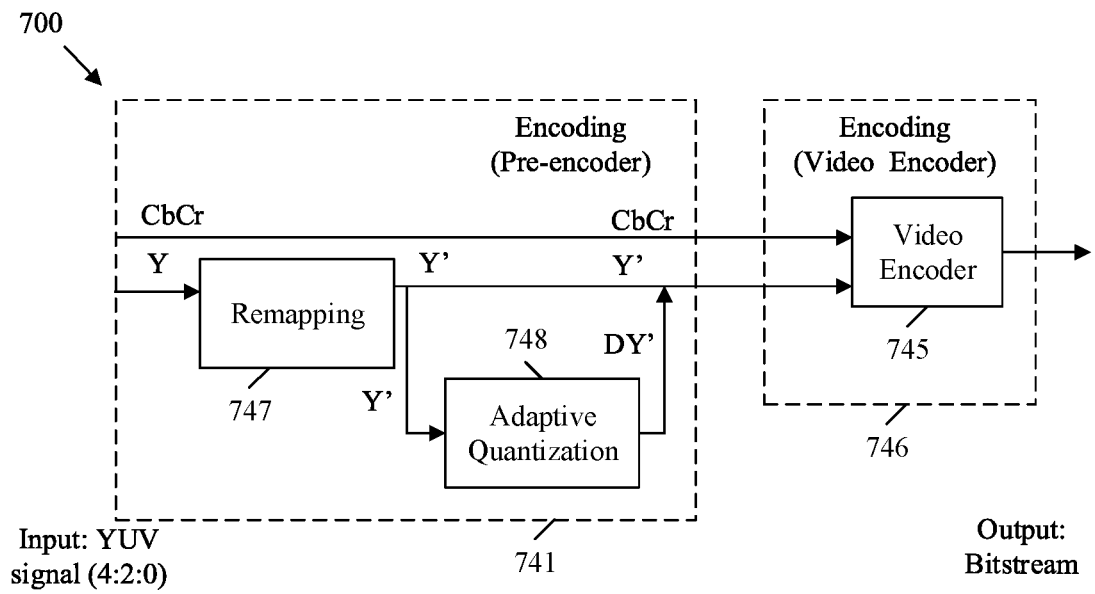
FIG. 7 is a schematic diagram illustrating an example multi-stage video encoder with an example pre-encoder configured to pre-encode luma components.

FIG. 7 is a schematic diagram illustrating an example multi-stage video encoder 700 with an example pre-encoder 741 configured to pre-encode luma components. For example, the multi-stage video encoder 700 may act as a specific implementation of the multi-stage video encoder 500. Hence, the multi-stage video encoder 700 may be employed to implement steps 101, 103, 105, 107, and/or 109 of operating method 100, a codec system 200, and/or an encoder 300. The multi-stage video encoder 700 is depicted with two encoding stages for clarity of discussion. However, additional encoding stages may be added as discussed with respect to multi-stage video encoder 500.

The multi-stage video encoder 700 includes a pre-encoder 741, which can be employed to implement first video pre-encoder 541, a second video pre-encoder 543, etc. The multi-stage video encoder 700 also includes an encoding stage 746 with a video encoder 745, which may be substantially similar to encoding stage 546 and video encoder 545, respectively. Specifically, the video encoder 745 is connected to the pre-encoder 741 in a cascade configuration. Further, the video encoder 745 may operate as a H.264/AVC encoder and/or a H.265/HEVC encoder. In the depicted example, multi-stage video encoder 700 pre-encodes luma components in the input video signal while passing the chroma components through to the video encoder 745 without modification. Accordingly, the pre-encoder 741 pre-encodes an input video signal to create a pre-encoded video signal with compressed luma components and un-compressed chroma components. Specifically, the pre-encoder 741 pre-encodes the input video signal to create a compact pre-encoded video signal. The pre-encoder 741 can also forward the pre-encoded video signal to the video encoder 745. The video encoder 745 can then encode the compressed/compact pre-encoded video signal to create a video bitstream for transmission to a decoder. Hence, the input video signal in YUV/YCbCr format is received as input for the multi-stage video encoder 700. The input is pre-encoded by the first pre-encoder 741 to obtain a compact and optimized video signal for use as input to the successive Nth video encoder 745.

The pre-encoder 741 contains a remapping component 747 and an adaptive quantization component 748, which are employed to pre-encode the video signal. While the remapping component 747 and the adaptive quantization component 748 are depicted as compressing the luma components only, the remapping component 747 and/or the adaptive quantization component 748 can also be applied only to the chroma components or to both the luma components and chroma components as discussed with respect to the FIGs. below. In any of the embodiments described herein, the remapping component 747 and an adaptive quantization component 748 aim to obtain a compact signal for input to the successive pre-encoder(s) and/or the video encoder 745. Specifically, the remapping component 747 and the adaptive quantization component 748 can be used alone or in conjunction to pre-encode the input video signal by performing reversible modifications to the input video signal. Such reversible modifications to the input video signal received at the multi-stage video encoder 700 can be reconstructed at a decoder. Obtaining such a reconstructed video signal involves reversing such reversible modifications at a post-decoder as discussed below.

The remapping component 747 is configured to remap the input video signal to a more compact form to support lower complexity during compression by the video encoder 745. For example, the remapping component 747 is configured to pre-encode the input video signal by applying a transfer function to compress the input video signal for example by reducing the variance between input video signal values (e.g. luma value or chroma values). In the example depicted in FIG. 7, the remapping component 747 pre-encodes a luminance/luma portion of the input video signal. For example, the remapping component 747 may reduce a maximum value of the input video signal, increase a minimum value of the input video signal, shift an average value of the input video signal, or some combinations thereof, to compress the input video signal. The remapping component 747 may also maintain side information regarding the input video signal. Side information includes characteristics (e.g., signal features) of the input video signal prior to pre-encoding. Hence, the side information can be used by a decoder to reverse the modifications made during pre-encoding. The side information may include a maximum value of the input video signal, a minimum value of the input video signal, an average value of the input video signal, etc. prior to pre-encoding. The remapping component 747 can forward the side information to the encoder 745, which can encode the side information in the bitstream for transmission toward a decoder.

The adaptive quantization component 748 is configured to pre-encode the input video signal by quantizing a component of the input video signal, resulting in a more compact pre-encoded video signal. The adaptive quantization component 748 can directly receive the input video stream or the output of the remapping component 747, depending on the example. The adaptive quantization component 748 can be applied to the input video signal regardless of whether the input video signal contains float type data or integer type data. Quantization can also be referred to as scaling. For example, the adaptive quantization component 748 can apply an adaptive quantization function to convert the input video signal to quantized values and/or change the scale of such values in order to compress the input video signal into a pre-encoded video signal. Adaptive quantization includes adaptive the quantization function based on the input values. In order for the quantization function to be considered adaptive, the adaptive quantization function can include a first transfer function applied to input video signal values above a threshold and a second transfer function applied to input video signal values equal to or below the threshold. In the example depicted in FIG. 7, the adaptive quantization component 748 pre-encodes a luminance/luma portion of the input video signal.

Accordingly, the multi-stage video encoder 700 includes at least one pre-encoder 741 that receives an input video signal, employs a remapping component 747 and/or an adaptive quantization component 748 to pre-encode the input video signal by remapping and/or adaptive quantization to create a pre-encoded video signal, and outputs a pre-encoded video signal. The multi-stage video encoder 700 also includes a video encoder 745 that receives the pre-encoded video signal from the pre-encoder 741. The video encoder 745 can then encode the pre-encoded video signal as a bitstream. The bitstream can then be transmitted, for example via a transmitter, toward a decoder to support decoding to create a reconstructed video signal. As noted above, the video encoder 745 can encode an input signal, in this case a pre-encoded video signal, by partitioning the video signal, and then applying inter-prediction and/or intra-prediction. Hence, the pre-encoder 741 can pre-encode the input video signal as a pre-encoded video signal (e.g., by applying a remapping function and/or adaptive quantization function) prior to allowing the video encoder 745 to partition the pre-encoded video signal as part of encoding the pre-encoded video signal.

In the implementation of video codec design, pre-processing may be employed before the video encoder is applied. However, the pre-processing is different than pre-encoding since the change to input signal in pre-processing may not be recovered. Therefore, pre-processing may change the video quality in a manner that is unrecovered. Further, the fact that the change in the peak signal to noise ratio (PSNR) of an encoded video is usually lost indicates that an inverse mechanism for the pre-processing may not be employed in the post-processing after decoding. The present disclosure performs pre-encoding and an inverse mechanism in post-decoding. Therefore, the video quality change caused by pre-encoding can be reserved so that the results of post-decoding are matched with those in pre-encoding.

Figure 8:
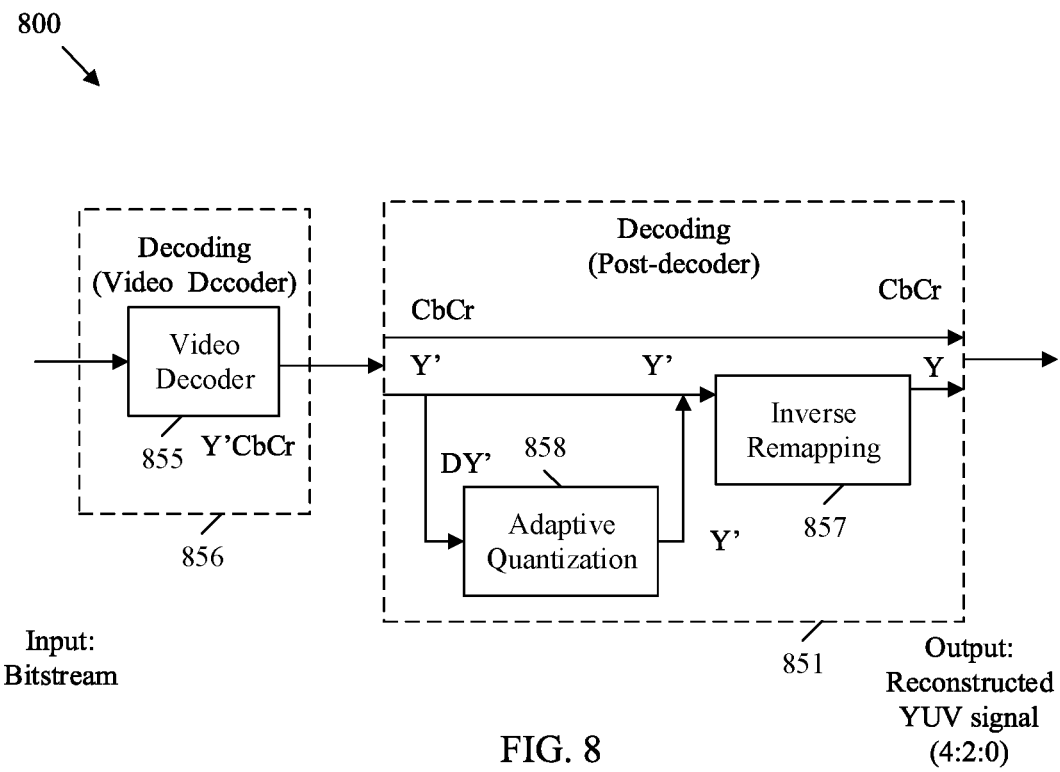
FIG. 8 is a schematic diagram illustrating an example multi-stage video decoder with an example post-decoder configured to post-decode luma components.

FIG. 8 is a schematic diagram illustrating an example multi-stage video decoder 800 with an example post-decoder 851 configured to post-decode luma components. For example, the multi-stage video decoder 800 may act as a specific implementation of the multi-stage video decoder 600. Hence, the multi-stage video decoder 800 may be employed to implement steps 111, 113, 115, and/or 117 of operating method 100, a codec system 200, and/or a decoder 400. The multi-stage video decoder 800 is depicted with two decoding stages for clarity of discussion. However, additional decoding stages may be added as discussed with respect to multi-stage video decoder 600. Further, multi-stage video decoder 800 is configured to decode a video bitstream output by a multi-stage video encoder 700.

The multi-stage video decoder 800 includes a post-decoder 851, which can be employed to implement first video post-decoder 651, a second video post-decoder 653, etc. The multi-stage video decoder 800 also includes a decoding stage 856 with a video decoder 855, which may be substantially similar to a decoding stage 652 and a video decoder 651, respectively. Specifically, the video decoder 855 is connected to the post-decoder 851 in a cascade configuration. Further, the video decoder 855 may operate as a H.264/AVC decoder and/or a H.265/HEVC decoder. The video decoder 855 can receive a video bitstream from an encoder as an input. The video decoder 855 can decode the video bitstream to obtain a decoded video signal in YUV/YCbCr format. The decoded video signal is forwarded from the video decoder 855 to the post-decoder 851 along with any side information obtained from the bitstream. The post decoder 851 can then perform post-decoding on the decoded video signal to reverse the compression caused by pre-encoding. This results in the creation of a reconstructed video signal in YUV/YCbCr format, which can be output from the post decoder 851 for display to a user, for example via a display screen.

The post-decoder 851 contains an inverse remapping component 857 and an adaptive quantization component 858, which are employed to post-decode the decoded video signal received from the video decoder 855. Specifically, the inverse remapping component 857 and the adaptive quantization component 858 are configured to perform an inverse mechanism to the remapping component 747 and the adaptive quantization component 748 in the multi-stage video encoder 700. While the inverse remapping component 857 and the adaptive quantization component 858 are depicted as decompressing the luma components only, the inverse remapping component 857 and/or the adaptive quantization component 858 can also be applied only to the chroma components or to both the luma components and chroma components as discussed with respect to the FIGs. below. In any of the embodiments described herein, the inverse remapping component 857 and the adaptive quantization component 858 aim to decompress a compact signal received from the video decoder 855 via any successive post-decoder(s) 851. Specifically, the inverse remapping component 857 and the adaptive quantization component 858 can be used alone or in conjunction to post-decode the decoded video signal by reversing modifications made to an input video signal by a corresponding pre-encoder at an encoder. Reversing such modifications results in obtaining a reconstructed video signal at the multi-stage video decoder 800 for output to a user that is the reconstructed video signal of the input video signal at the multi-stage video encoder 700 prior to pre-encoding by a pre-encoder.

The inverse remapping component 857 is configured to perform the inverse function of the remapping component 747. As such, the inverse remapping component 857 can be configured to post-decode the decoded video signal from the video decoder 855 for example by increasing the variance between decoded video signal values (e.g. luma value or chroma values). The inverse remapping component 857 may receive input directly from the video decoder 855 or via the adaptive quantization component 858, depending on the example. In the example depicted in FIG. 8, the inverse remapping component 857 post-decodes a luminance/luma portion of the decoded video signal. For example, the inverse remapping component 857 may apply a function to increase a maximum value of the decoded video signal, decrease a minimum value of the decoded video signal, shift an average value of the decoded video signal, or combinations thereof, to de-compress the decoded video signal. In some examples, the inverse remapping component 857 may receive side information from the bitstream via the video decoder 855. The side information includes signal features/characteristics intended for the reconstructed video signal as determined by a pre-encoder at a multi-stage encoder. Specifically, the side information can describe the signal characters of the input video signal prior to pre-encoding. Hence, the inverse remapping component 857 can use such information to post-decode the decoded video signal in order to reverse the pre-encoding process and create a reconstructed video signal that matches the input video signal at the encoder.

The adaptive quantization component 858 is configured to post-decode the decoded video signal by reversing the quantization of a component of the decoded video signal, resulting in a de-quantized and less compact reconstructed video signal. Specifically, the adaptive quantization component 858 can apply an inverse adaptive quantization function to convert decoded video signal to de-quantized values in order to de-compress the decoded video signal into the reconstructed video signal. The inverse adaptive quantization function may including a first inverse transfer function applied to values above a threshold and a second inverse transfer function applied to values equal to or below the threshold. In the example depicted in FIG. 8, the adaptive quantization component 858 post-decodes a luminance/luma portion of the decoded video signal.

Accordingly, the multi-stage video decoder 800 is configured to receive a bitstream from an encoder, for example via a receiver. The multi-stage video decoder 800 employs a video decoder 855 to decode the bitstream into a decoded video signal, and output the decoded video signal toward the post-decoder 851. The post-decoder 851 can then receive the decoded video signal, post-decode the decoded video signal to create a reconstructed video signal, and output the reconstructed video signal for display via a display screen. As noted above, the video decoder 855 can decode a bitstream by applying inter-prediction and/or intra-prediction to generate reconstructed video frames and storing the resulting reconstructed video frames in a decoded picture buffer. Accordingly, the decoded video signal includes such reconstructed video frames. Hence, the decoded video signal can be post-decoded by applying an inverse remapping function and/or an inverse adaptive quantization function to the reconstructed video frames stored in the decoded picture buffer.

It should be noted that, when implementing a video codec design, various pre-processing mechanisms can be applied to pre-process an input video signal prior to forwarding the input video signal to a multi-stage video encoder 700. Such pre-processing may include filtering the signal for noise or otherwise improving signal quality, for example by reducing the signal to noise ratio (SNR) of the input video signal. Such pre-processing is distinct from pre-encoding as discussed herein. For example, signal changes made during pre-processing are not intended to be recovered and reversed at a multi-stage video decoder 800. Hence, pre-processing changes may not be tracked and details of such changes may be lost prior to encoding. Further, post-processing may also improve the SNR of a decoded video signal. In that since, pre-processing and post-processing both perform a similar function and work together synergistically to improve the quality of the video signal displayed to an end user. In contrast, pre-encoding is designed to be reversed by post-decoding. As such, pre-encoding compresses an input video signal and post-decoding reverses pre-encoding by de-compressing a decoded video signal. Pre-encoding and post-decoding are not intended to alter video signal quality. Accordingly, the input to a pre-encoding process may be bit matched to the output of a post-decoding process.

It should also be noted that in FIGS. 7-8, the remapping component 747, adaptive quantization component 748, inverse remapping component 857, and adaptive quantization component 858 are applied to compress/de-compress luma components. However, the remapping component 747, adaptive quantization component 748, inverse remapping component 857, and adaptive quantization component 858 can also be applied to chroma components (e.g., UV/CbCr) as shown in the FIGs. below. Further, in FIGS. 7-8, the remapping component 747 is applied in cascade fashion before the adaptive quantization component 748, and the adaptive quantization component 858 is applied in cascade fashion prior to the inverse remapping component 857. However, such components can be used in any order. For example, the adaptive quantization component 748 could also be applied in cascade fashion before the remapping component 747, and the inverse remapping component 857 could be applied in cascade fashion prior to the adaptive quantization component 858. Further, while FIGS. 7-8 depict the remapping component 747, the adaptive quantization component 748, the inverse remapping component 857, and the adaptive quantization component 858, the remapping functions are independent of the adaptive quantization functions. Accordingly, the remapping component 747 and the inverse remapping component 857 can be employed independently of the adaptive quantization component 748 and the adaptive quantization component 858, and vice versa.

Figure 9:
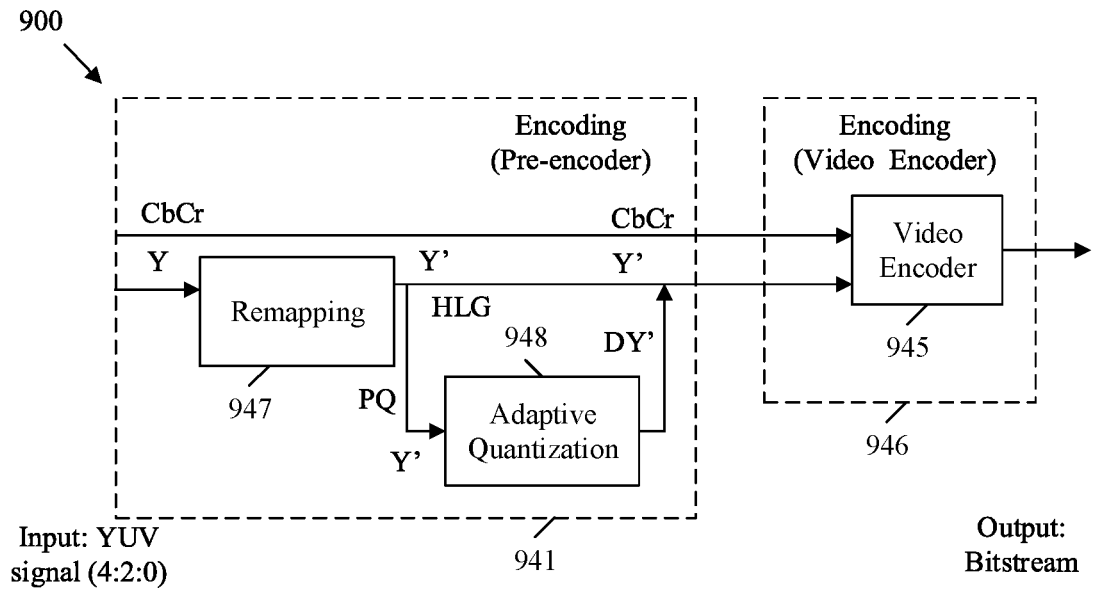
FIG. 9 is a schematic diagram illustrating an example multi-stage video encoder with an example pre-encoder configured to operate on Hybrid Log Gamma (HLG) and Perceptual Quantize (PQ) input video signals.

FIG. 9 is a schematic diagram illustrating an example multi-stage video encoder 900 with an example pre-encoder 941 configured to operate on HLG and PQ input video signals. For example, multi-stage video encoder 900 can operate as a specific implementation of a multi-stage video encoder 500 and/or 700. Hence, the multi-stage video encoder 900 may be employed to implement steps 101, 103, 105, 107, and/or 109 of operating method 100, a codec system 200, and/or an encoder 300. The multi-stage video encoder 900 is depicted with two encoding stages for clarity of discussion. However, additional encoding stages may be added as discussed with respect to multi-stage video encoder 500.

Multi-stage video encoder 900 includes a pre-encoder 941 with a remapping component 947 and an adaptive quantization component 948 and an encoding stage 946 with a video encoder 945, which may be substantially similar to pre-encoder 741, remapping component 747, adaptive quantization component 748, encoding stage 746, and a video encoder 745, respectively. However, multi-stage video encoder 900 is further configured for pre-encoding and then encoding high dynamic range (HDR) video. As such, the input video signal received at the multi-stage video encoder 900 may be a HLG and/or a PQ signal. HLG and PQ are two example formats for describing HDR video. HLG signals use a format changes relative to signal value. Specifically, HLG employs a non-linear transfer function in which a gamma curve is employed to describe the lower half of signal values and a logarithmic curve is employed to describe the upper half of signal values. In contrast, PQ signals also employ a non-linear transfer function, but the non-linear transfer function used is consistent over the range of possible values. Accordingly, HLG signal format describes input video signal values in relative terms while PQ signal format describes input video signal values in consistent terms. As such, HLG signals and PQ signals may be pre-encoded differently.

For example, HLG signals and PQ signals may both be remapped by the remapping component 947. However, the adaptive quantization component 948 may be applied when the input video signal is a PQ signal, but not when the input video signal is a HLG signal. Specifically, HLG signals may be remapped and then passed directly to the video encoder 945 while PQ signals may be both remapped and adaptively quantized before being passed to the video encoder 945. This is because the adaptive quantization function for a PQ signal may compress the gamma curve portion of the HLG signal in a manner that is inconsistent with the compression of the logarithmic portion of the HLG signal. However, an adaptive quantization function may be suitable for application to an HLG signal to compress the gamma curve portion of the HLG signal in a manner that is consistent with the compression of the logarithmic portion of the HLG signal.

For example, the remapping component 947 can apply a remapping function to a HDR signal where the remapping function includes:

$$Y' = SLF(\text{InversePQ}(Y)) \text{ if } Y \text{ is an PQ signal}$$

$$\text{or } Y' = SLF(\text{InverseHLG}(Y)) \text{ if } Y \text{ is an HLG signal} \quad \text{(Equation 1)}$$

in which, $$SLF(l) = a \times \left( \frac{p \times l}{(p-1) \times l + 10} \right)^m + b \quad \text{(Equation 2)}$$

where Y is the input video signal (e.g., in terms of luma), Y' is the pre-encoded video signal, InversePQ is an inverse PQ transfer function, InverseHLG is an inverse HLG transfer function, the function of PQ/InversePQ are defined in ST.2084, and the function of HLG/InverseHLG are defined in ARIB STD-B67, SLF(l) is a non-linear function (SLF), a and b are both equal to 1.12762, m equals 0.14 and p equals 1.4 if Y is an PQ signal, and m equals 0.3 and p equals 2.3 if Y is a HLG signal.

Further, the adaptive quantization component 948 can apply an adaptive quantization function to a HDR signal where the adaptive quantization function includes:

$$DY' = Q(Y') \quad \text{(Equation 3)}$$

$$= \begin{cases} \text{weight} \times (Y' + w \times Y' + b) + \text{offset} & \text{if } Y' < T \\ \text{weight} \times Y' + \text{Offset} & \text{else} \end{cases}$$

where Y' is the signal fed into adaptive quantization, DY' is an adaptively quantized video signal, the parameters can be set as. e.g. weight is equal to 1/876, offset is equal to 64, T is a threshold of 0.15, w is equal to −0.33, and b is equal to 0.05.

Specifically, if the input video signal is a PQ signal, the luminance component of the input HDR signal Y is forwarded to the remapping component 947 and is remapped as Y'. Y' is then forwarded to the adaptive quantization component 948 to obtain quantized/scaled signal DY', which acts as the luminance component of a pre-encoded video signal used as the input at the video encoder 945. Further, if the input video signal is an HLG signal, the luminance component of the input HDR signal Y is forwarded to the remapping component 947 and is remapped as Y'. Y' is then forwarded as the pre-encoded video signal used as the input at the video encoder 945. In this example, for both PQ and HLG, the chrominance component of the HDR input video signal is not changed by the pre-encoder 941, and hence the chrominance component is output of pre-encoder as the input at the video encoder 945.

In the example of FIG. 9, when the input video signal is a HDR signal, pre-encoding is employed by the pre-encoder 941 to obtain a pre-encoded HDR video signal for encoding by the video encoder 945. Further, the pre-encoding is performed on the input HDR video signal before the pre-encoded video signal is forwarded to the video encoder 945. By using similar components at a decoder, the HDR reconstructed video signal output by the decoder is the reconstructed signal of the HDR input video signal prior to pre-encoding.

Also, as in multi-stage video encoder 500, side information can be forwarded from the pre-encoder 941 to the video encoder 945 for inclusion in the video bitstream. The side information can then be used for post-decoding to obtain bit matched output at the decoder. The side information can be obtained during pre-encoding at pre-encoder 941. Further, the side information can be obtained by any other pre-encoding mechanism and/or be pre-determined. In such case, the side information may be set at the decoder by default, in which case signaling of the side information may be omitted. As discussed above, the side information may include information describing the input video signal features, such as average value of the input video signal, maximum value of the input video signal, the minimum value of the input video signal, etc. prior to pre-encoding. The side information can be signaled in the video bitstream with specified number of bits, for example sixteen bits, twelve bits, ten bits, etc. The number of bits used may depend on the precision employed in post-decoding for YUV video signal reconstruction. The side information can be signaled in a certain syntax level in the video bitstream, e.g., the header of sequence, the header of picture, the header of slice, etc.

Figure 10:
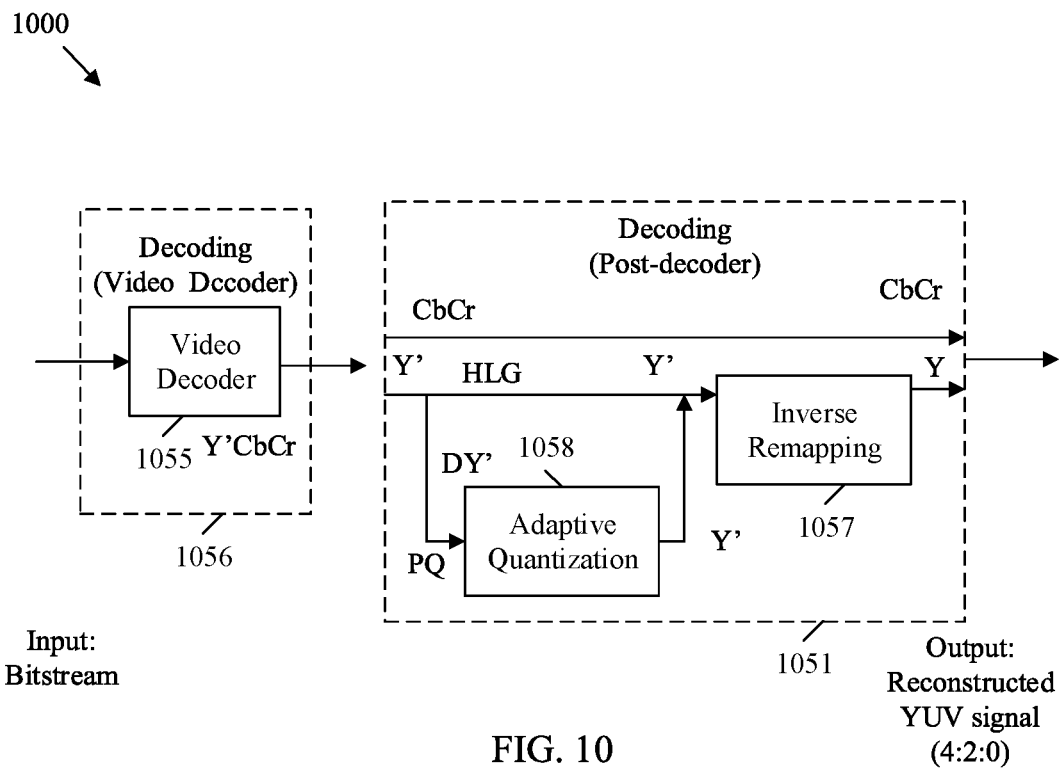
FIG. 10 is a schematic diagram illustrating an example multi-stage video decoder with an example post-decoder configured to operate on HLG and PQ input video signals.

FIG. 10 is a schematic diagram illustrating an example multi-stage video decoder 1000 with an example post-decoder 1051 configured to operate on HLG and PQ input video signals. For example, multi-stage video decoder 1000 can operate as a specific implementation of a multi-stage video decoder 600 and/or 800. Hence, the multi-stage video decoder 1000 may be employed to implement steps 111, 113, 115, and/or 117 of operating method 100, a codec system 200, and/or a decoder 400. The multi-stage video decoder 1000 is depicted with two decoding stages for clarity of discussion. However, additional decoding stages may be added as discussed with respect to multi-stage video decoder 600. Further, multi-stage video decoder 1000 is configured to decode a bitstream containing HDR video as encoded by a multi-stage video encoder 900.

Multi-stage video decoder 1000 includes a post-decoder 1051 with an inverse remapping component 1057 and an adaptive quantization component 1058 and a decoding stage 1056 with a video decoder 1055, which may be substantially similar to post-decoder 851, an inverse remapping component 857, adaptive quantization component 858, decoding stage 856, and video decoder 855, respectively. However, multi-stage video decoder 1000 is further configured for decoding and then post-decoding HDR video. As such, the bitstream received at the multi-stage video decoder 1000 may contain HLG and/or PQ related data. In order to mirror the video encoder 900, HLG signals may be decoded by decoder 1055 and passed directly to the inverse remapping component 1057 for inverse remapping while PQ signals may be decoded and then be both inverse remapped and inverse adaptively quantized to obtain a reconstructed video signal. Hence, the adaptive quantization component 1058 may be applied to PQ signals and may not be applied to HLG signals.

For example, the inverse remapping component 1057 can apply an inverse remapping function to a HDR signal where the inverse remapping function includes:

$Y=PQ(InverseSLF(Y'))$ if $Y$ is an PQ signal or $Y=HLG(InverseSLF(Y'))$ if $Y$ is a HLG signal   (Equation 4)

in which, $$inverseSLF(Y') = \frac{1}{p \times \left(\frac{Y'-b}{a}\right)^{-\frac{1}{m}} - p + 1.0}$$   (Equation 5)

where Y is the reconstructed video signal (e.g., in terms of luma), Y' is the decoded video signal, PQ (InverseSLF) is a PQ transfer function, HLG (InverseSLF) is a HLG transfer function, the function of PQ/InversePQ are defined in ST.2084, and the function of HLG/InverseHLG are defined in ARIB STD-B67, inverseSLF(Y') is an inverse SLF non-linear function, the parameters can be set as, e.g. a and b are both equal to 1.12762, m equals 0.14 and p equals 1.4 if Y is an PQ signal, and m equals 0.3 and p equals 2.3 if Y is a HLG signal.

Further, the adaptive quantization component 1058 can apply an inverse adaptive quantization function to a HDR signal where the inverse adaptive quantization function includes:

$Y' = inverseQ(DY')$   (Equation 6)

$$\begin{cases} ((DY' - \text{Offset}) \times \text{weight} - b) / & \\ \quad (1-w) & \text{if } DY' < T \\ DY' \times \text{weight} + \text{Offset} & \text{else} \end{cases}$$

where Y' is the de-quantized signal, DY' is an adaptively quantized video signal, InverseQ is an inverse quantization function, the parameters can be set as, e.g. weight is equal to 1/876, offset is equal to 64, T is a threshold of 0.15, w is equal to −0.33, and b is equal to 0.05.

Specifically, if the bitstream contains PQ related data, the luminance decoded video signal DY' from the video decoder 1055 is forwarded to the adaptive quantization component 1058 for inverse adaptive quantization to obtain a de-quantized signal Y'. Y' is then forwarded to the inverse remapping component 1057 to obtain the luminance Y as the luminance component of the output reconstructed 4:2:0 YCbCr HDR video signal. Further, if the bitstream contains HLG related data, the luminance decoded video signal DY' from video decoder 1055 is forwarded directly to the inverse remapping component 1057 to obtain the luminance Y as the luminance component of the output reconstructed 4:2:0 YCbCr HDR video signal. For both PQ and HLG, the chrominance component of the decoded video signal from video decoder 1055 is not changed and is output as the chrominance component of the reconstructed 4:2:0 YCbCr HDR video signal. Side information can be employed for inverse remapping by inverse remapping component 1057 as discussed above.

Figure 11:
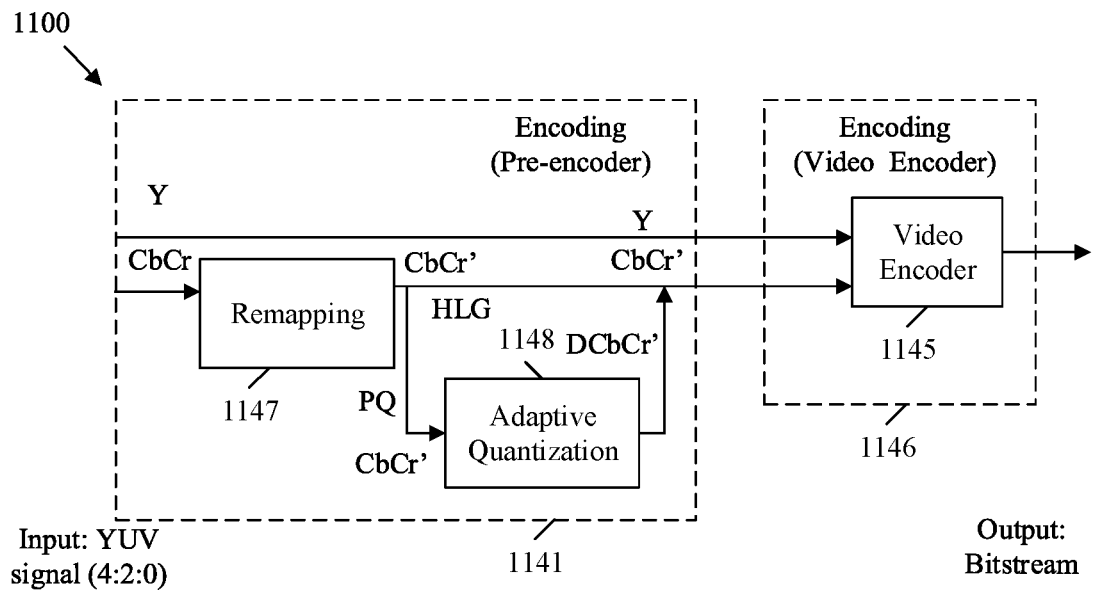
FIG. 11 is a schematic diagram illustrating an example multi-stage video encoder with an example pre-encoder configured to pre-encode chroma components.

FIG. 11 is a schematic diagram illustrating an example multi-stage video encoder 1100 with an example pre-encoder 1141 configured to pre-encode chroma components. For example, the multi-stage video encoder 1100 may act as a specific implementation of the multi-stage video encoder 500. Hence, the multi-stage video encoder 1100 may be employed to implement steps 101, 103, 105, 107, and/or 109 of operating method 100, a codec system 200, and/or an encoder 300. The multi-stage video encoder 1100 is depicted with two encoding stages for clarity of discussion. However, additional encoding stages may be added as discussed with respect to multi-stage video encoder 500. Further, multi-stage video encoder 1100 provides an alternate implementation of multi-stage video encoders 700 and 900.

The multi-stage video encoder 1100 includes a pre-encoder 1141 with a remapping component 1147 and an adaptive quantization component 1148 and an encoding stage 1146 with a video encoder 1145, which may be substantially similar to pre-encoder 741, remapping component 747, adaptive quantization component 748, encoding stage 746, and a video encoder 745, respectively. However, the remapping component 1147 and the adaptive quantization component 1148 are applied to the chrominance components (e.g., CbCr/UV) and not to the luma (e.g., Y) components of an input video signal. Accordingly, the remapping component 1147 pre-encodes and applies a remapping function to chrominance components of the input video signal. Further, the adaptive quantization component 1148 pre-encodes and applies an adaptive quantization function to chrominance components of the input video signal. The multi-stage video encoder 1100 can also be applied to HDR content by applying remapping to HLG signal and applying both remapping and adaptive quantization to PQ signals as discussed with respect to multi-stage video encoder 900 above.

Figure 12:
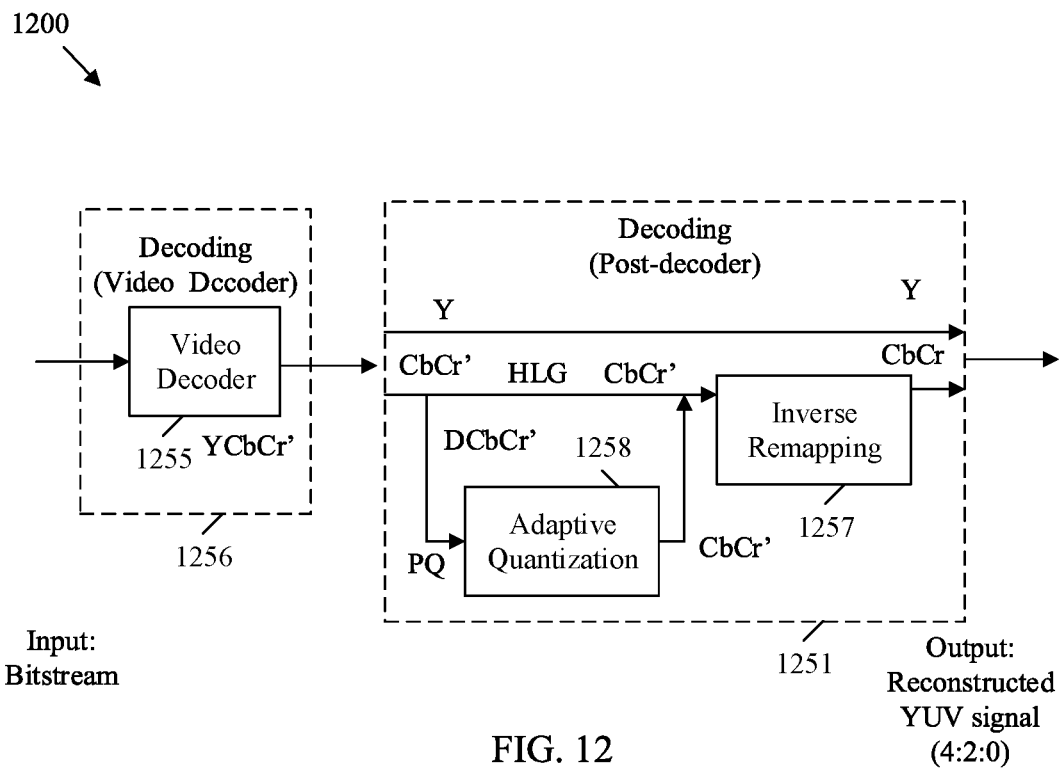
FIG. 12 is a schematic diagram illustrating an example multi-stage video decoder with an example post-decoder configured to post-decode chroma components.

FIG. 12 is a schematic diagram illustrating an example multi-stage video decoder 1200 with an example post-decoder 1251 configured to post-decode chroma components. For example, the multi-stage video decoder 1200 may act as a specific implementation of the multi-stage video decoder 600. Hence, the multi-stage video decoder 1200 may be employed to implement steps 111, 113, 115, and/or 117 of operating method 100, a codec system 200, and/or a decoder 400. The multi-stage video decoder 1200 is depicted with two encoding stages for clarity of discussion. However, additional encoding stages may be added as discussed with respect to multi-stage video decoder 600. Further, multi-stage video decoder 1200 is configured to decode a video bitstream output by a multi-stage video encoder 1100. In addition, multi-stage video decoder 1200 provides an alternate implementation of multi-stage video decoders 800 and 1000.

The multi-stage video decoder 1200 includes a post-decoder 1251 with an inverse remapping component 1257 and an adaptive quantization component 1258 and a decoding stage 1256 with a video decoder 1255, which may be substantially similar to post-decoder 851, inverse remapping component 857, adaptive quantization component 858, decoding stage 856, and video decoder 855, respectively. However, the inverse remapping component 1257 and the adaptive quantization component 1258 are applied to the chrominance components (e.g., CbCr/UV) and not to the luma (e.g., Y) components of a decoded video signal. Accordingly, the inverse remapping component 1257 post-decodes and applies an inverse remapping function to chrominance components of the decoded video signal. Further, the adaptive quantization component 1258 post-decodes and applies an inverse adaptive quantization function to chrominance components of the decoded video signal. The multi-stage video decoder 1200 can also be applied to HDR content by applying inverse remapping to HLG signal and applying both inverse remapping and inverse adaptive quantization to PQ signals as discussed with respect to multi-stage video decoder 1000 above.

Figure 13:
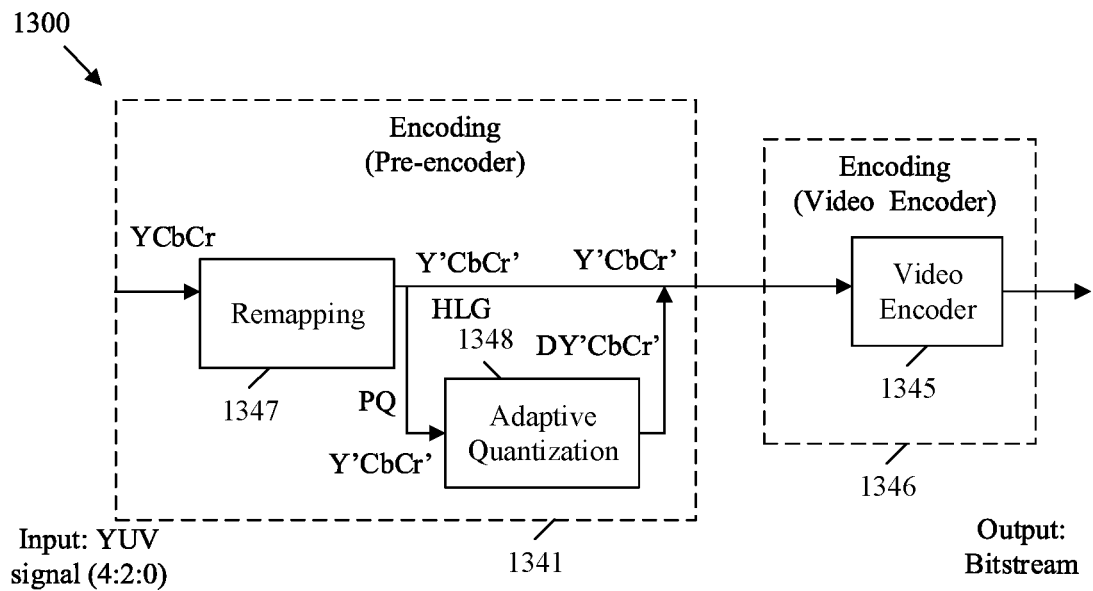
FIG. 13 is a schematic diagram illustrating an example multi-stage video encoder with an example pre-encoder configured to pre-encode luma and chroma components.

FIG. 13 is a schematic diagram illustrating an example multi-stage video encoder 1300 with an example pre-encoder 1341 configured to pre-encode luma and chroma components. For example, the multi-stage video encoder 1300 may act as a specific implementation of the multi-stage video encoder 500. Hence, the multi-stage video encoder 1300 may be employed to implement steps 101, 103, 105, 107, and/or 109 of operating method 100, a codec system 200, and/or an encoder 300. The multi-stage video encoder 1300 is depicted with two encoding stages for clarity of discussion. However, additional encoding stages may be added as discussed with respect to multi-stage video encoder 500. Further, multi-stage video encoder 1300 provides an alternate implementation of multi-stage video encoders 700, 900, and 1100.

The multi-stage video encoder 1300 includes a pre-encoder 1341 with a remapping component 1347 and an adaptive quantization component 1348 and an encoding stage 1346 with a video encoder 1345, which may be substantially similar to pre-encoder 741, remapping component 747, adaptive quantization component 748, encoding stage 746, and a video encoder 745, respectively. However, the remapping component 1347 and the adaptive quantization component 1348 are applied to both the chrominance components (e.g., CbCr/UV) and the luma (e.g., Y) components of an input video signal. Accordingly, the remapping component 1347 pre-encodes and applies a remapping function to chrominance components and luminance components of the input video signal. Further, the adaptive quantization component 1348 pre-encodes and applies an adaptive quantization function to chrominance components and luminance components of the input video signal. The multi-stage video encoder 1300 can also be applied to HDR content by applying remapping to YUV components of a HLG signal and applying both remapping and adaptive quantization to YUV components of PQ signals as discussed with respect to multi-stage video encoder 900 above.

Figure 14:
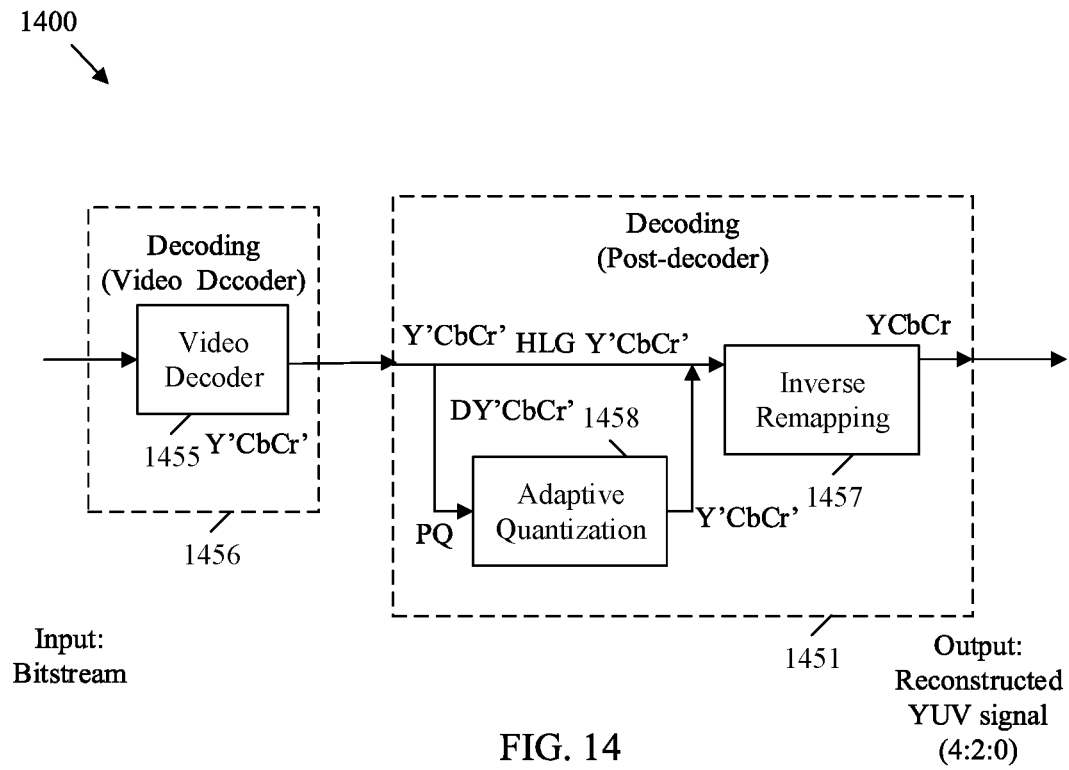
FIG. 14 is a schematic diagram illustrating an example multi-stage video decoder with an example post-decoder configured to post-decode luma and chroma components.

FIG. 14 is a schematic diagram illustrating an example multi-stage video decoder 1400 with an example post-decoder 1455 configured to post-decode luma and chroma components. For example, the multi-stage video decoder 1400 may act as a specific implementation of the multi-stage video decoder 600. Hence, the multi-stage video decoder 1400 may be employed to implement steps 111, 113, 115, and/or 117 of operating method 100, a codec system 200, and/or a decoder 400. The multi-stage video decoder 1400 is depicted with two encoding stages for clarity of discussion. However, additional encoding stages may be added as discussed with respect to multi-stage video decoder 600. Further, multi-stage video decoder 1400 is configured to decode a video bitstream output by a multi-stage video encoder 1300. In addition, multi-stage video decoder 1400 provides an alternate implementation of multi-stage video decoders 800, 1000, and 1200.

The multi-stage video decoder 1400 includes a post-decoder 1451 with an inverse remapping component 1457 and an adaptive quantization component 1458 and a decoding stage 1456 with a video decoder 1455, which may be substantially similar to post-decoder 851, inverse remapping component 857, adaptive quantization component 858, decoding stage 856, and video decoder 855, respectively. However, the inverse remapping component 1457 and the adaptive quantization component 1458 are applied to both the chrominance components (e.g., CbCr/UV) and the luma (e.g., Y) components of a decoded video signal. Accordingly, the inverse remapping component 1457 post-decodes and applies an inverse remapping function to chrominance components and luminance components of the decoded video signal. Further, the adaptive quantization component 1458 post-decodes and applies an inverse adaptive quantization function to chrominance components and luminance components of the decoded video signal. The multi-stage video decoder 1400 can also be applied to HDR content by applying inverse remapping to YUV components of an HLG signal and applying both inverse remapping and inverse adaptive quantization to YUV components of PQ signals as discussed with respect to multi-stage video decoder 1000 above.

It can be easily understood that the input video signal received at the multi-stage video encoder 900, 1100, 1300 may be a HLG and/or a PQ signal, and the bitstream received at the multi-stage video decoder 1000, 1200, 1400 may be a HLG and/or a PQ signal bitstream. HLG and PQ are two example formats for describing HDR video. The signal flow for a PQ signal encoded by a multi-stage video encoder 900, 1100, and/or 1300 in FIG. 9, FIG. 11, and FIG. 13 and decoded by the multi-stage video decoder 1000, 1200, and/or 1400 in FIG. 10, FIG. 12, and/or FIG. 14, can be replaced for use with an HLG signal, or vice versa. Further, the signal flow for an HLG signal can be replaced for use with a PQ signal in such figures.

Figure 15:
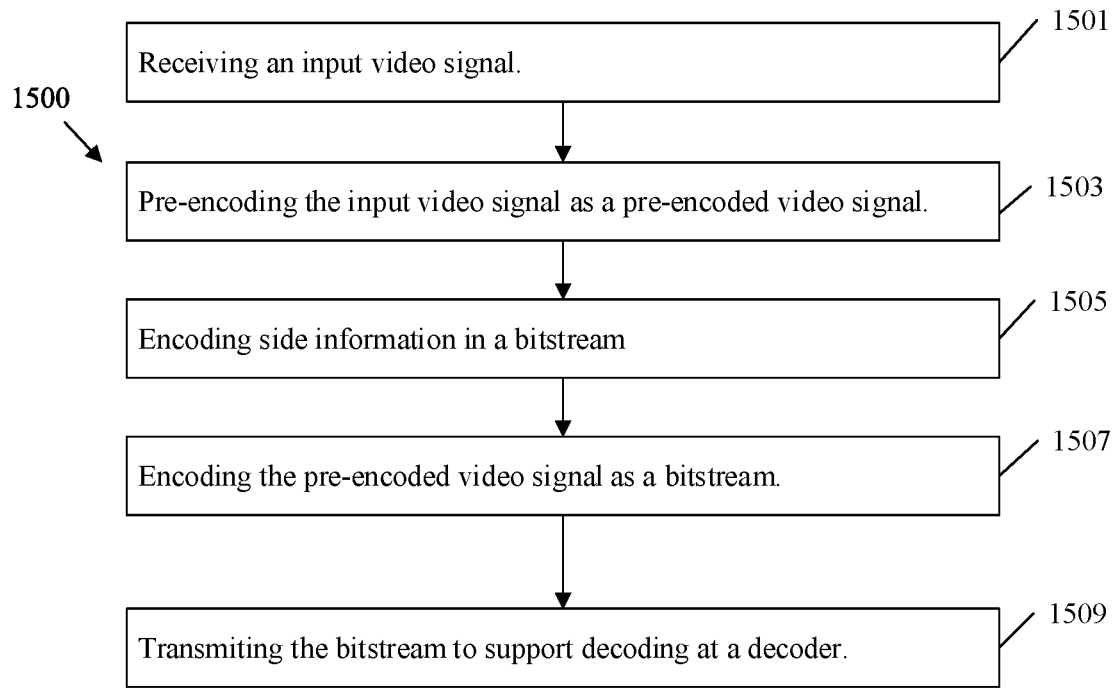
FIG. 15 is a flowchart of an example method of pre-encoding an input video signal.

FIG. 15 is a flowchart of an example method 1500 of pre-encoding an input video signal. For example, method 1500 may be applied by a multi-stage video encoder 500, 700, 900, 1100, and/or 1300. Hence, method 1500 can be employed in conjunction with steps 101, 103, 105, 107, and/or 109 of operating method 100, codec system 200, and/or encoder 300 to encode an input video signal.

Method 1500 can be implemented in a video coding device. Method 1500 can be initiated upon receiving an input video signal at step 1501. The input video signal can be received at a processor, for example from a video recording device and via port. At step 1503, the input video signal is pre-encoded as a pre-encoded video signal by one or more pre-encoding components. Pre-encoding the input video signal can include performing reversible modifications to the input video signal. The reversible modifications can result in a reconstructed video signal at a decoder after reversing the reversible modifications at a post-decoder where the reconstructed video signal matches the input video signal. Pre-encoding the input video signal at step 1503 may include applying a function to reduce a maximum value of the input video signal, increase a minimum value of the input video signal, shift an average value of the input video signal, or combinations thereof, to compress the input video signal. Further, pre-encoding the input video signal at step 1503 may include applying a remapping function according to equations 1-2 as discussed above. In addition, pre-encoding the input video signal at step 1503 may include pre-encoding a luminance portion of the input video signal, a chrominance portion of the input video signal, or combinations thereof.

At step 1505, side information can be passed from a pre-encoder to an encoder for inclusion in a bitstream. The side information may include signal features of the input video signal prior to pre-encoding. At step 1507, the pre-encoded video signal is encoded as a bitstream by a video encoder at an Nth encoding stage, for example along with side information. As noted above, encoding the pre-encoded video signal can include partitioning the pre-encoded video signal along with performing inter-prediction and intra-prediction. As such, the input video signal is pre-encoded as a pre-encoded video signal at step 1503 prior to partitioning the pre-encoded video signal at step 1507. At step 1509, the bitstream can be transmitted to support decoding at a decoder.

Figure 16:
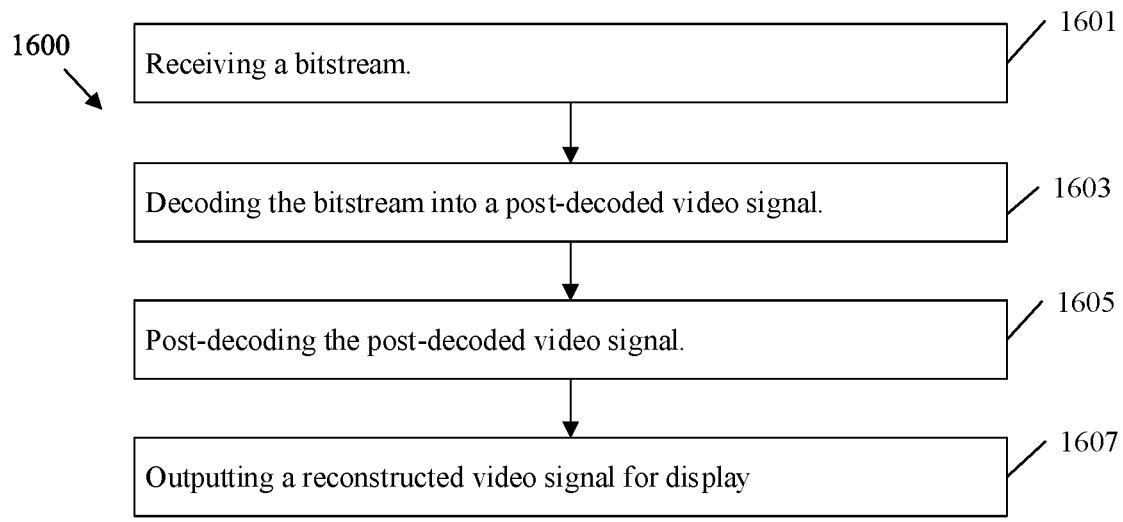
FIG. 16 is a flowchart of an example method of post-decoding a decoded video signal.

FIG. 16 is a flowchart of an example method 1600 of post-decoding a decoded video signal. For example, method 1600 may be applied by a multi-stage video decoder 600, 800, 1000, 1200, and/or 1400. Hence, method 1600 can be employed in conjunction with steps 111, 113, 115, and/or 117 of operating method 100, codec system 200, and/or decoder 400 to post-decode a decoded video signal to obtain a reconstructed video signal that is bit matched to an input video signal prior to pre-encoding. As such, method 1600 may operate to post-decode a decoded video signal that has been decoded from a bitstream encoded according to method 1500.

Method 1600 can be implemented in a video coding device. Method 1600 can be initiated upon receiving a bitstream at step 1601, for example from an encoder via a receiver. The received bitstream can be stored in memory upon receipt for further processing. At step 1603, the bitstream is decoded into a decoded video signal by an Nth stage video decoder.

At step 1605, the decoded video signal is post-decoded by one or more post-decoding components. Post-decoding the decoded video signal can include reversing modifications made to an input video signal at an encoder to create a reconstructed video signal. The reconstructed video signal matches the input video signal as received at an encoder prior to performing pre-encoding by a pre-encoder. The decoded video signal may be stored in a decoded picture buffer upon as part of decoding at step 1603. Hence, the decoded video signal can be post-decoded at step 1605 by applying an inverse remapping function to reconstructed video frames stored in a decoded picture buffer. Post-decoding the decoded video signal at step 1605 can include post-decoding a luminance portion of the decoded video signal, a chrominance portion of the decoded video signal, or combinations thereof. Further, the decoded video signal can be post-decoded at step 1605 based on side information obtained from the bitstream. The side information can include signal features of the reconstructed video signal as determined by a pre-encoder. For example, side information can be employed to allow a post-decoder to apply an inverse remapping function to increase a maximum value of the decoded video signal, decrease a minimum value of the decoded video signal, shift an average value of the decoded video signal, or combinations thereof, to de-compress the decoded video signal. In addition, post-decoding the decoded video signal at step 1605 may include applying an inverse remapping function according to equations 4-5 as discussed above. At step 1607, a reconstructed video signal is output for display, for example via a display screen.

Experimental results show that the compression performance of a codec according to the present disclosure is increased. The average bitrate reduction for DE100 and PSNRL100 are 7.3% and 6.3% respectively, and 19.2% bitrate reduction for video codec. The encoding time and decoding time is nearly unchanged. This indicates that the framework of the present disclosure has significant benefits over other video codecs while the overall complexity is lower.

Figure 17:
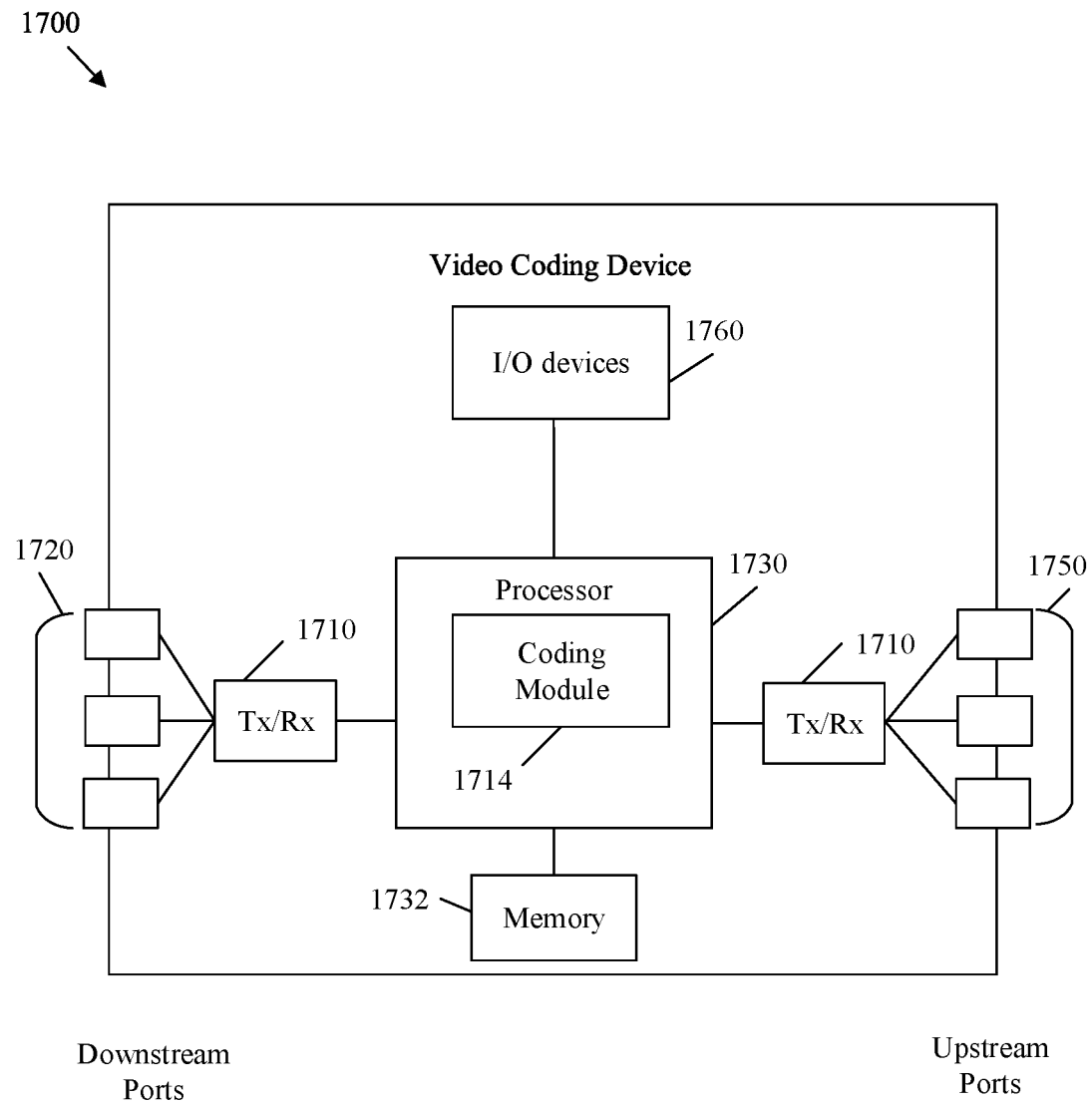
FIG. 17 is a schematic diagram of an example video coding device.

FIG. 17 is a schematic diagram of an example video coding device 1700. The video coding device 1700 is suitable for implementing the disclosed examples/embodiments as described herein. The video coding device 1700 comprises downstream ports 1720, upstream ports 1750, and/or transceiver units (Tx/Rx) 1710, including transmitters and/or receivers for communicating data upstream and/or downstream over a network. The video coding device 1700 also includes a processor 1730 including a logic unit and/or central processing unit (CPU) to process the data and a memory 1732 for storing the data. The video coding device 1700 may also comprise optical-to-electrical (OE) components, electrical-to-optical (EO) components, and/or wireless communication components coupled to the upstream ports 1750 and/or downstream ports 1720 for communication of data via optical or wireless communication networks. The video coding device 1700 may also include input and/or output (I/O) devices 1760 for communicating data to and from a user. The I/O devices 1760 may include output devices such as a display for displaying video data, speakers for outputting audio data, etc. The I/O devices 1760 may also include input devices, such as a keyboard, mouse, trackball, etc., and/or corresponding interfaces for interacting with such output devices.

The processor 1730 is implemented by hardware and software. The processor 1730 may be implemented as one or more CPU chips, cores (e.g., as a multi-core processor), field-programmable gate arrays (FPGAs), application specific integrated circuits (ASICs), and digital signal processors (DSPs). The processor 1730 is in communication with the downstream ports 1720, Tx/Rx 1710, upstream ports 1750, and memory 1732. The processor 1730 comprises a coding module 1714. The coding module 1714 implements the disclosed embodiments, aspects, and/or examples described above described herein. As such, coding module 1714 improves the functionality of the video coding device 1700 as well as addresses problems that are specific to the video coding arts. Further, coding module 1714 effects a transformation of the video coding device 1700 to a different state. Alternatively, the coding module 1714 can be implemented as instructions stored in the memory 1732 and executed by the processor 1730 (e.g., as a computer program product stored on a non-transitory medium).

The memory 1732 comprises one or more memory types such as disks, tape drives, solid-state drives, read only memory (ROM), random access memory (RAM), flash memory, ternary content-addressable memory (TCAM), static random-access memory (SRAM), etc. The memory 1732 may be used as an over-flow data storage device, to store programs when such programs are selected for execution, and to store instructions and data that are read during program execution.

Figure 18:
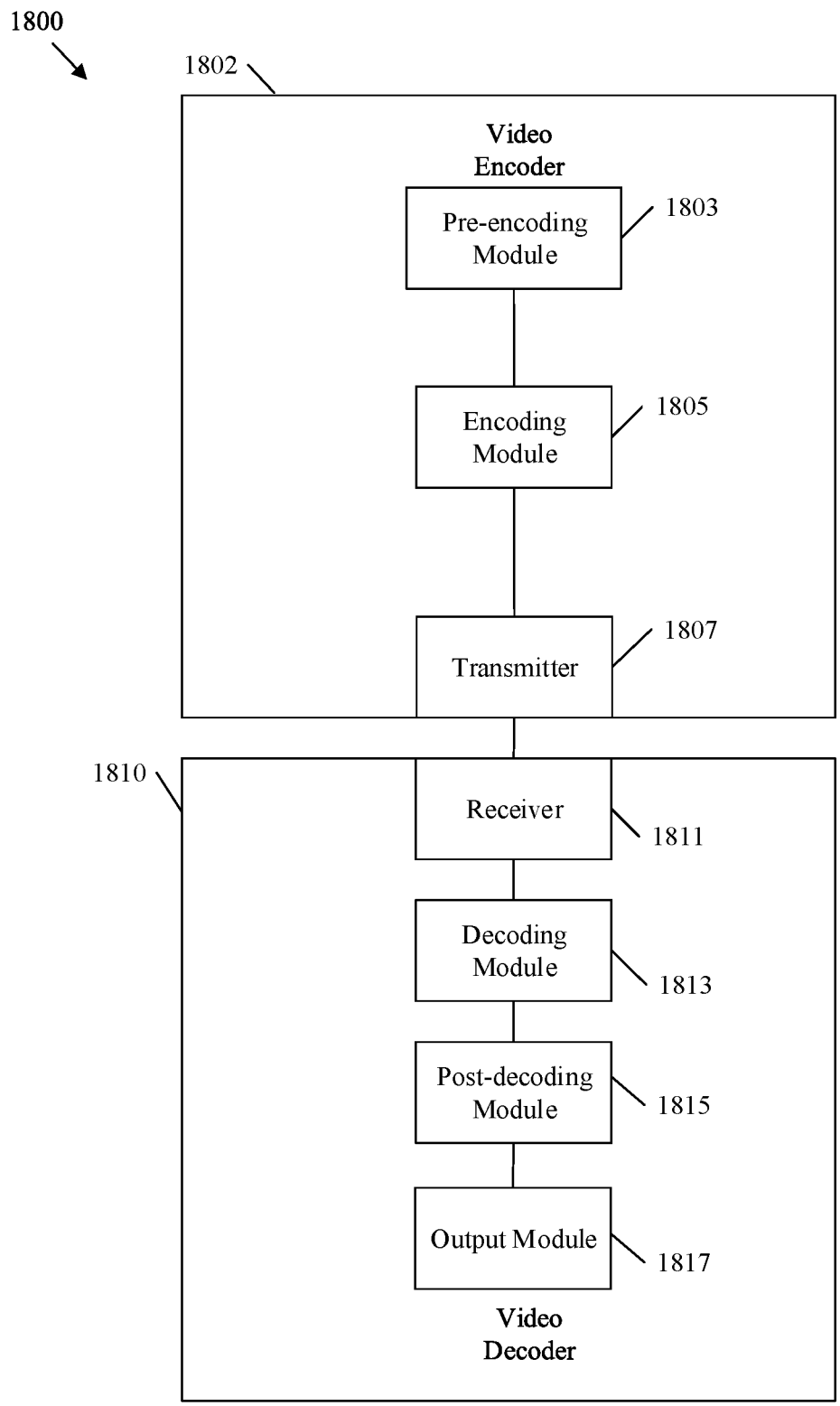
FIG. 18 is a schematic diagram of an example system for pre-encoding and post-decoding video signals.

FIG. 18 is a schematic diagram of an example system 1800 for pre-encoding and post-decoding video signals. The system 1800 includes an encoder 1802 and a decoder 1810, which can be implemented by a codec system 200, an encoder 300, and/or a decoder 400.

The encoder 1802 comprises at least one pre-encoding module 1803 for receiving an input video signal, pre-encoding the input video signal, and outputting a pre-encoded video signal. The encoder 1802 also comprises at least one encoding module 1805 for receiving the pre-encoded video signal from the pre-encoding module 1803, and encoding the pre-encoded video signal as a bitstream. The encoder 1802 also comprises a transmitting module 1807 for transmitting the bitstream to support decoding at a decoder. The encoder 1802 is also configured to perform any of the steps of method 1500.

The decoder 1810 comprises a receiving module 1811 for receiving a bitstream. The decoder 1810 also comprises a decoding module 1813 for decoding the bitstream into a decoded video signal. The decoder 1810 also comprises a post-decoding module 1815 for post-decoding the decoded video signal. The decoder 1810 also comprises an output module 1817 for outputting a reconstructed video signal for display. The decoder 1810 is also configured to perform any of the steps of method 1600.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

The invention claimed is:

1. A video coding device, comprising:
at least one pre-encoder configured to:
  obtain an input video signal,
  pre-encode the input video signal, and
  output a pre-encoded video signal; and
an encoder configured to:
  obtain the pre-encoded video signal from the at least one pre-encoder, and
  encode the pre-encoded video signal as a bitstream, wherein the bitstream is used to be transmitted to a decoder for decoding,
wherein the at least one pre-encoder includes a remapping component, and wherein a function applied by the remapping component includes:

$$I''=SLF(InversePQ(I)) \text{ when } I \text{ is a PQ signal,}$$

$$\text{or } I''=SLF(InverseHLG(I)) \text{ when } I \text{ is an HLG signal}$$

wherein $$SLF(I') = a \times \left(\frac{p \times I'}{(p-1) \times I' + 1.0}\right)^m + b,$$

wherein I is the input video signal, I" is the pre-encoded video signal, InversePQ is an inverse perceptual quantize (PQ) transfer function, InverseHLG is an inverse hybrid log gamma (HLG) transfer function, SLF(I') is a non-linear function (SLF) applied to an inverse PQ or HLG function, and a, b, m, and p are constants.

2. The video coding device of claim 1, wherein the at least one pre-encoder is configured to perform modifications to the input video signal, where the modifications allow the input video signal to be reconstructed after reversing the modifications at a post-decoder.

3. The video coding device of claim 1, wherein the remapping component is configured to pre-encode the input video signal by applying one or more of: a function to change a maximum value of the input video signal, a function to change a minimum value of the input video signal, and a function to shift an average value of the input video signal, so as to compress the input video signal.

4. The video coding device of claim 1, wherein a and b are both equal to 1.12762; m equals 0.14 and p equals 1.4 when I is a PQ signal; and m equals 0.3 and p equals 2.3 when I is an HLG signal.

5. The video coding device of claim 1, wherein the at least one pre-encoder is configured to forward side information to the encoder for encoding the side information in the bitstream, the side information including signal features of the input video signal prior to pre-encoding.

6. A video coding device, comprising:
at least one decoder configured to:
decode a bitstream to obtain a decoded video signal, and
output the decoded video signal; and
at least one post-decoder configured to:
obtain the decoded video signal from the at least one decoder,
post-decode the decoded video signal, and
output a reconstructed video signal for display,
wherein the at least one post-decoder includes an inverse remapping component, and wherein a function applied by the inverse remapping component includes:

I=PQ(InverseSLF(I')) when I is a PQ signal or I=HLG(InverseSLF(I')) when I is an HLG signal wherein, $$inverseSLF(I') = \frac{1}{p \times \left(\frac{I'-b}{a}\right)^{-\frac{1}{m}} - p + 1.0}$$

wherein I is the reconstructed video signal, I' is the decoded video signal, PQ (InverseSLF) is a perceptual quantize (PQ) transfer function, HLG (InverseSLF) is a hybrid log gamma (HLG) transfer function, inverseSLF(I') is an inverse non-linear function (SLF), and a, b, m, and p are constants.

7. The video coding device of claim 6, wherein the video coding device includes a cascade of decoders and post-decoders, wherein the cascade of decoders and post-decoders includes N decoders and post-decoders, and N is an integer larger than one, and at least one of the decoders comprises entropy decoding functions capable of decoding the bitstream to obtain the decoded video signal, and wherein the decoded video signal is more compact than the reconstructed video signal.

8. The video coding device of claim 6, wherein the inverse remapping component is configured to post-decode the decoded video signal by applying one or more of: a function to change a maximum value and of the decoded video signal, a function to change a minimum value of the decoded video signal, and a function to shift an average value of the decoded video signal, so as to de-compress the decoded video signal.

9. The video coding device of claim 6, wherein a and b are both equal to 1.12762; m equals 0.14 and p equals 1.4 when I is a PQ signal; and m equals 0.3 and p equals 2.3 when I is an HLG signal.

10. The video coding device of claim 8, wherein the inverse remapping component is configured to post-decode the decoded video signal based on side information obtained from the bitstream, the side information including signal features used to reconstruct the video signal by the at least one post-decoder.

11. The video coding device of claim 10, wherein the side information is signaled in a syntax level in the bitstream, wherein the syntax level is a header of a sequence, a header of a picture, or a header of a slice.

12. A method implemented in a video coding device, the method comprising:
decoding, by one or more processors, a received bitstream into a decoded video signal;
post-decoding, by the one or more processors, the decoded video signal to obtain a reconstructed video signal; and
outputting, by the one or more processors, the reconstructed video signal for display,
wherein a function applied includes:

I=PQ(InverseSLF(I')) when I is a PQ signal or I=HLG(InverseSLF(I')) when I is an HLG signal wherein, $$inverseSLF(I') = \frac{1}{p \times \left(\frac{I'-b}{a}\right)^{-\frac{1}{m}} - p + 1.0}$$

wherein I is the reconstructed video signal, I' is the decoded video signal, PQ (InverseSLF) is a perceptual quantize (PQ) transfer function, HLG (InverseSLF) is a hybrid log gamma (HLG) transfer function, inverseSLF(I') is an inverse non-linear function of SLF, and wherein a, b, m, and p are constants.

13. The method of claim 12, wherein the post-decoding the decoded video signal includes applying one or more of: a function to change a maximum value of the decoded video signal, a function to change a minimum value of the decoded video signal, and a function to shift an average value of the decoded video signal, so as to de-compress the decoded video signal.

14. The method of claim 12, wherein a and b are both equal to 1.12762; m equals 0.14 and p equals 1.4 when I is a PQ signal; and m equals 0.3 and p equals 2.3 when I is an HLG signal.

15. The method of claim 12, wherein the decoded video signal is post-decoded based on side information obtained from the bitstream, the side information including signal features used to reconstruct the video signal by the one or more processors.

16. The video coding device of claim 1, wherein a luma component of the input video signal is pre-encoded without pre-encoding a chroma component of the input video signal, or a chroma component of the input video signal is pre-encoded without pre-encoding a luma component of the input video signal, or both a luma component and a chroma component of the input video signal are pre-encoded.

17. The video coding device of claim 6, wherein a luma component of the input video signal is pre-encoded without pre-encoding a chroma component of the input video signal, or a chroma component of the input video signal is pre-encoded without pre-encoding a luma component of the input video signal, or both a luma component and a chroma component of the input video signal are pre-encoded.

18. The method of claim 12, wherein a luma component of the input video signal is pre-encoded without pre-encoding a chroma component of the input video signal, or a chroma component of the input video signal is pre-encoded without pre-encoding a luma component of the input video signal, or both a luma component and a chroma component of the input video signal are pre-encoded.

\* \* \* \* \*